US012377647B2

(12) United States Patent
Yardley

(10) Patent No.: US 12,377,647 B2
(45) Date of Patent: Aug. 5, 2025

(54) AUTOMATED LOADING AND UNLOADING SYSTEM FOR TEXTILE PRINTING

(71) Applicant: Livingston Systems, LLC, Denver, CO (US)

(72) Inventor: Ronald Joseph Yardley, Hermosa Beach, CA (US)

(73) Assignee: Livingston Systems, LLC, Denver, CO (US)

( * ) Notice: Subject to any disclaimer, the term of this patent is extended or adjusted under 35 U.S.C. 154(b) by 613 days.

(21) Appl. No.: 17/654,828

(22) Filed: Mar. 15, 2022

(65) Prior Publication Data

US 2022/0288918 A1 Sep. 15, 2022

Related U.S. Application Data

(60) Provisional application No. 63/260,348, filed on Aug. 17, 2021, provisional application No. 63/200,557, filed on Mar. 15, 2021.

(51) Int. Cl.
*B41F 15/26* (2006.01)
*B41F 17/38* (2006.01)
*B41J 3/407* (2006.01)

(52) U.S. Cl.
CPC .............. *B41F 15/26* (2013.01); *B41F 17/38* (2013.01); *B41J 3/4078* (2013.01)

(58) Field of Classification Search
CPC ...... B41F 15/26; B41F 15/0863; B41F 15/18; B41F 16/0046; B41F 16/02; B41F 17/005;

(Continued)

(56) References Cited

U.S. PATENT DOCUMENTS 3,783,073 A 1/1974 Wamberg
D246,083 S 10/1977 Auersperg (Continued)

FOREIGN PATENT DOCUMENTS

JP 6004169 B2 10/2016
JP 6015906 B2 10/2016

(Continued)

OTHER PUBLICATIONS

"Tag Along" dated Oct. 18, 2014, Available from the Internet at https://www.youtube.com/watch?v=-3KWYB9gmLAat least as early as May 5, 2016.

(Continued)

*Primary Examiner* — Stephen D Meier
*Assistant Examiner* — Quang X Nguyen
(74) *Attorney, Agent, or Firm* — Trenner Law Firm, LLC; Mark Trenner

(57) ABSTRACT

An automated loading and unloading system for textile printing is disclosed. An example system includes a pallet configured with a label printing portion outside of a frame on an image screen when loaded onto the printing machine. The example system also includes a loading device configured to automatically lift a label area of a textile into position on the label printing portion of the pallet in preparation for a printing operation on the textile. The example system also includes an unloader device configured to automatically remove the label area of the textile from the label printing portion of the pallet following the printing operation on the textile. In an example, a printhead adapter is configured to reach the label printing portion of the pallet for printing on the label area of the textile.

20 Claims, 24 Drawing Sheets

(58) Field of Classification Search
CPC .. B41F 17/38; B41P 2215/50; B41P 2217/61; B41J 11/06; B41J 3/4078
See application file for complete search history.

(56) References Cited

U.S. PATENT DOCUMENTS

| | | | |
|---|---|---|---|
| 4,058,055 | A | 11/1977 | Douglas |
| 4,287,826 | A | 9/1981 | Brabec |
| 4,753,164 | A | 6/1988 | Barnes |
| 4,819,559 | A | 4/1989 | Szarka |
| 4,846,058 | A | 7/1989 | Farris |
| 4,908,912 | A | 3/1990 | Grant |
| 4,930,413 | A | 6/1990 | Jaffa |
| 5,107,758 | A | 4/1992 | Withers |
| 5,161,466 | A | 11/1992 | Burris |
| 5,199,353 | A | 4/1993 | Szyszko |
| 5,226,362 | A | 7/1993 | Iaccino et al. |
| 5,247,885 | A | 9/1993 | Iaccino |
| 5,327,827 | A | 7/1994 | Richardson |
| 5,784,956 | A * | 7/1998 | Walz .................. B41F 15/0863 101/115 |
| 6,631,985 | B2 | 10/2003 | Koizumi |
| 6,640,714 | B1 | 11/2003 | Papa |
| 6,651,554 | B1 | 11/2003 | Williams |
| 7,413,301 | B2 | 8/2008 | Niimi |
| D648,784 | S | 11/2011 | Horito et al. |
| D702,529 | S | 4/2014 | Herrera |
| 9,302,462 | B2 | 4/2016 | Livingston |
| D765,775 | S | 9/2016 | Livingston |
| 9,849,665 | B2 | 12/2017 | Livingston |
| 10,189,278 | B1 | 1/2019 | Friedrich et al. |
| 10,479,070 | B2 | 11/2019 | Livingston |
| 11,491,777 | B2 | 11/2022 | Livingston |
| 2004/0000240 | A1 | 1/2004 | Oleson |
| 2004/0189776 | A1 | 9/2004 | Niimi |
| 2005/0278984 | A1 | 12/2005 | Kenney |
| 2006/0203069 | A1 | 9/2006 | Niimi et al. |
| 2013/0057632 | A1 | 3/2013 | Moriya |
| 2013/0336702 | A1 | 12/2013 | Yanagishita |
| 2015/0360460 | A1 * | 12/2015 | Livingston ............. B41F 15/28 347/110 |
| 2016/0159075 | A1 | 6/2016 | Livingston |
| 2018/0072044 | A1 | 3/2018 | Livingston |
| 2018/0333949 | A1 | 11/2018 | Edwards |
| 2022/0212462 | A1 * | 7/2022 | Friedrich ............... B41J 11/002 |
| 2024/0123725 | A1 | 4/2024 | Livingston |

FOREIGN PATENT DOCUMENTS

| | | |
|---|---|---|
| WO | WO2020227311 | 11/2020 |
| WO | WO2021250659 | 12/2021 |

OTHER PUBLICATIONS

Screenshots of website http://littlesistersystem.com/ and corresponding videos linked from this website. Videos uploaded Feb. 18, 2013 and May 25, 2009, respectively, 3 pages total.

* cited by examiner

AUTOMATED LOADING AND UNLOADING SYSTEM FOR TEXTILE PRINTING

RELATED APPLICATIONS

This application is related to U.S. Provisional Patent Application No. 63/200,557 filed Mar. 15, 2021 of Ronald Joseph Yardley and Livingston Systems, LLC titled "Automated Loading And Unloading System For Textile Printing," and U.S. Provisional Patent Application No. 63/260,348 filed Aug. 17, 2021 of Ronald Joseph Yardley and Livingston Systems, LLC titled "Automated Loading And Unloading System For Textile Printing," each hereby incorporated by reference in its entirety as though fully set forth herein.

BACKGROUND

Modern printing techniques enables printing designs such as logos, texts, photos, and other graphics to be printed on a wide range of textiles such as those used for garments (e.g., shirts, t-shirts, pants, hats, and other clothing items), bags (e.g., cloth grocery bags), and other accessories.

Printers often want (or are required by law) to include a label with their printed product. In the past, these labels were printed separately and attached to the textile (e.g., by sewing below the inner collar of a shirt). More recently, these labels have been printed directly on the textile to reduce costs associated with applying a separate label and increase comfort for the wearer. However, a printer currently wanting to decorate the chest area of a t-shirt and also print a custom tag had to add a secondary or stand-alone printing operation for the tag area. For example, printing a label under the inside of the shirt collar requires removing the shirt from the platen, changing screens, changing out platens, turning the shirt inside-out, and then repositioning the shirt on the platen to print the label. This can be time consuming, and thus labor intensive and more expensive.

This was remedied by the introduction of the "Textile Printing Apparatus and Method" disclosed in U.S. Pat. No. 9,302,462. An example textile printing apparatus includes a first printing surface configured to support a first portion of a textile to be printed on (e.g., the outside shirt area). A second printing surface is configured to support a second portion of the textile for printing in the tag area. A slot is formed adjacent to the second printing surface. During a printing operation, a body of the shirt or other textile is mounted over the first printing surface, and an inner portion of the textile is pulled through the slot and mounted over the second printing surface. The printing operation proceeds to print both the outer printing surface of the shirt and the inner printing surface (e.g., a tag or label) without removing the shirt during the printing operation. However, the shirts or other textiles still have to be loaded/unloaded manually, slowing the printing operation and costing more for labor, and ultimately increasing the cost of the shirt or other textile.

DETAILED DESCRIPTION

Figure 1:
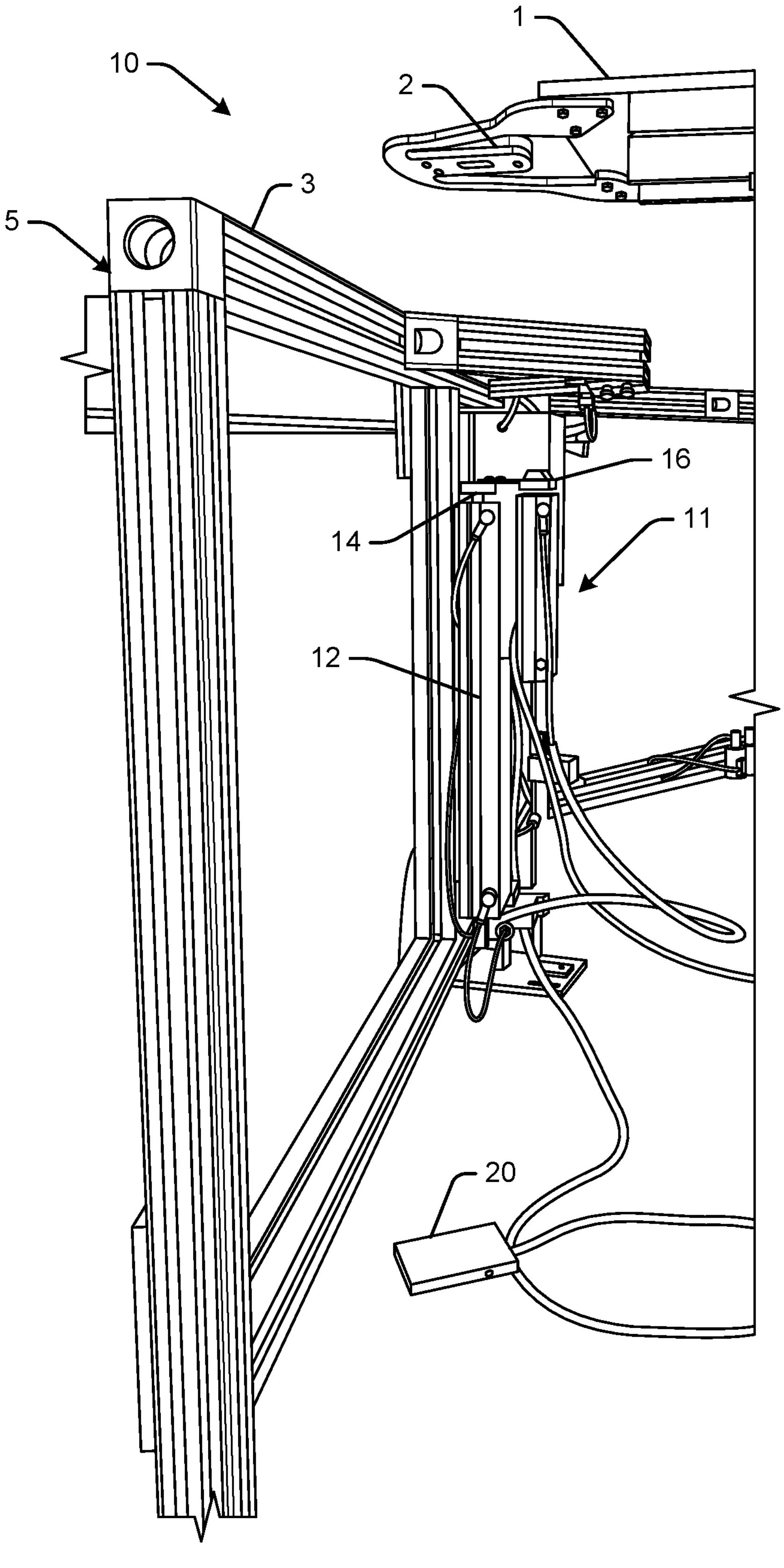
FIG. 1 is a perspective view of an example automated loading and unloading device as it may be installed on a print stand for printing on shirts, clothing, or other items.

An automated loading and unloading system for textile printing is disclosed which may enhance operation of a textile printing machine. An example automated loading and unloading system for textile printing may include or be operable with a pallet configured with a tag or label printing portion outside of a frame on an image screen when loaded onto the printing machine.

It is noted that the disclosure herein is not limited to use with any particular printing machine. While a screen printing machine is shown in the drawings, the automated loading and unloading system and methods of operation may be applied to screen printing, direct-to-garment printing, heat press (aka, heat printing, transfers, sublimation, direct-to-film), and any future apparel decorating processes. Likewise, while the automated loading and unloading system and methods of operation are illustrated herein with reference to multiple stations and/or platen machines, these can be applied to single station machines as well.

The textile printing machine may be configured to print on any suitable textile. Although the system and components are described herein with reference to printing on a t-shirt, other suitable textiles may also be printed on with modifications to accommodate the particular textile to be printed on. These modifications will be readily understood and well within the ability of one having ordinary skill in the art after becoming familiar with the disclosure herein.

The example system may include a loading device that automatically loads the textile by positioning the tag or label area of the textile in position on the tag or label printing portion of the pallet in preparation for a printing operation. The system may also include an unloader device that automatically unloads or removes the tag or label of the textile from the tag or label printing portion of the pallet following a printing operation. The system assists in the loading and unloading of the textile from the pallet (platen). The system makes loading and unloading faster, more consistent, and safer.

An example automated loading and unloading system for textile printing includes a pallet configured with a label printing portion outside of a frame on an image screen when loaded onto the printing machine. The example system also includes a loading device configured for a first stage of a two stage operation to automatically lift a label area of a textile into position on the label printing portion of the pallet in preparation for a printing operation on the textile. The example system also includes an unloader device configured for a second stage of the two stage operation to automatically remove the label area of the textile from the label printing portion of the pallet following the printing operation on the textile. In an example, the loading device and the unloader device are operating portions of the same device.

The example automated loading and unloading system also includes a finger assembly rotatably mounted to the second stage riser. The finger assembly is rotatable between a forward position and a rearward position. During an example loading operation, the finger assembly rotates from the rearward position to the forward position to load a label area of the textile onto the label printing portion of the pallet in advance of the printing operation in the label area of the textile. During an example unloading operation, the finger assembly rotates from the forward position to the rearward position to unload a label area of the textile from the label printing portion of the pallet after a printing operation in the label area of the textile.

In an example loading operation, the loading device lifts an upper back portion of a shirt through a slot formed in a label printing area of the pallet so that a neck of the shirt catches and remains on the label printing portion of the pallet for the printing operation.

In an example, the unloader device is configured to drop clear of shirts hanging down from the pallet during rotation of the pallet on the printing machine.

The example automated loading and unloading system may also include a printhead adapter configured to reach the label printing portion of the pallet for printing on the label area of the textile.

An example of the automated loading and unloading system for textile printing includes a foot pedal to actuate the loader device. The foot pedal may assist the operator by helping to keep the operator's hands free during operation.

The fingers may be connected into the pneumatic lines of the screen printing machines and actuated automatically based on feedback from one or more system sensors. In an example, separate up/down sensors may be provided in series with sensors on the screen print machines to reduce the possibility of the machine spinning when the devices are up.

Before continuing, it is noted that as used herein, the terms "includes" and "including" mean, but is not limited to, "includes" or "including" and "includes at least" or "including at least." The term "based on" means "based on" and "based at least in part on."

It is also noted that the term "automated" as used herein applies to all of fully automated, partly automated (and partly manually operated), and mechanically assisted.

It is also noted that the examples described herein are provided for purposes of illustration, and are not intended to be limiting. Other devices and/or device configurations may be utilized to carry out the operations described herein.

FIG. 1 is a perspective view of an example automated loading and unloading system 10 as it may be installed on a print stand for printing on shirts, clothing, or other textiles. The system 10 may include a loading and unloading device 11 having a base 12 with a first stage riser 14 and a second stage riser 16. The second stage riser 16 may be mounted to a top portion of the first stage riser 14 so that the second stage riser 16 extends above the first stage riser 14 when the second stage riser 16 is actuated.

It is noted that the terms "first" and "second" and "third" etc., as these relate to the riser(s) and positions of the riser(s), are for reference only and are not intended to be limiting in any manner unless specified as an ordering in the claims. For example, the second stage riser may be actuated and/or be specifically configured to actuate ahead of or simultaneously with the first stage riser. Likewise, the first stage riser may reach the second position at the same time the second stage riser reaches the third position. And in reverse order, the third position may occur before the first position.

In an example, the first stage riser 14 and/or the second stage riser 16 is activated by a sensor detecting that a shirt or other textile has been positioned on a platen 1 above the device 11. During operation, the first stage riser 14 is raised, and then the second stage riser 16 is actuated. The stage riser 16 may be actuated automatically or in response to raising of the first stage riser 14. In another example, the operator may press a foot pedal after the shirt is positioned on the platen 1 to actuate the second stage riser 16. Actuating the second stage riser 16 pushes the shirt collar over the lip of the tag or label printing portion 2 of the platen or pallet 1. Operations may be repeated to remove the shirt collar from the label printing portion 2 of the pallet 1.

It is noted that the example loading and unloading operations discussed above may be aided at least in part manually, e.g., by a human operator. That is, the second stage riser 16 may lift the shirt collar so that it can be easily slid over the tag or label printing portion 2 of the pallet 1 by the human operator using his or her hands.

In another example (see, e.g., device 11' in FIG. 11 discussed below), an arm mechanism having one or more "fingers" may be provided on the second stage riser to more fully automate the loading and/or unloading operations. In an example, the finger mechanism rotates to push the shirt collar over the lip of the tag or label printing portion 2 of the pallet 1, e.g., for a tag printing operation on the shirt. The finger mechanism may also be implemented in reverse to automatically remove the shirt collar from the label printing portion 2 of the pallet 1, e.g., following the printing operation.

During an example loading operation with the finger mechanism, the first stage riser 14 is raised, and then the second stage riser 16 is actuated. This is followed by a forward rotation of the finger mechanism to load the shirt collar area onto the tag or label printing portion 2 of the pallet 1.

During an example unloading operation with the finger mechanism, the first stage riser 14 is raised, and then the second stage riser 16 is actuated. This is followed by a reverse rotation of the finger mechanism to unload the shirt collar area from the tag or label printing portion 2 of the pallet 1.

In an example, the system 10 includes one or more sensor that detects when an operator loads a t-shirt onto a pallet 1. When the shirt is placed onto the pallet 1, a first stage pneumatic cylinder is actuated to automatically raise a second stage pneumatic cylinder into place. The operator then presses a foot pedal that actuates the second stage pneumatic cylinder. The second stage pneumatic cylinder lifts the upper back portion of the shirt up through a substantially U-shaped slot in the platen 1, and the shirt catches on the tag or label printing area 2 (e.g., the smaller "neck platen"). The operator can then adjust the position of the shirt tag area into place.

In an example, system 10 may be implemented as a two-stage operation. The first stage of the two-stage operation lifts the shirt into place on the tag or label printing portion 2 of the pallet 1. The second stage of the two-stage operation removes or "strips" the shirt from the tag or label printing portion 2 of the pallet 1.

During the two-stage operation, the mechanisms of the loading and unloading devices 11 drop below the guard rail 3 of the printing machine 5 to prevent the shirt from hanging up on the loading and unloading mechanisms when the shirt is moved (e.g., rotation) from one station to the next on the printing machine 5. The loading and unloading mechanisms may be dropped sufficiently far down so as not to catch on the shirt hanging off of the platen 1.

In an example, the automated loading and unloading device 11 is configured to both load and unload the shirt during a printing operation. In this example, one station of the printing machine 5 is configured (e.g., programmed and/or manually actuated) for both loading and unloading operations.

In another example, separate devices 11 are provided for the loading operation and for the unloading operation. In an example, the separate devices 11 are located at separate stations on the printing machine 5, and are configured (e.g., programmed and/or manually actuated) for only loading or unloading operations. For example, a device 11 may be configured as a loading device and provided at one station, while another device 11 may be configured as an unloading device 11 and provided at another station of the printing machine 5.

Figure 2:
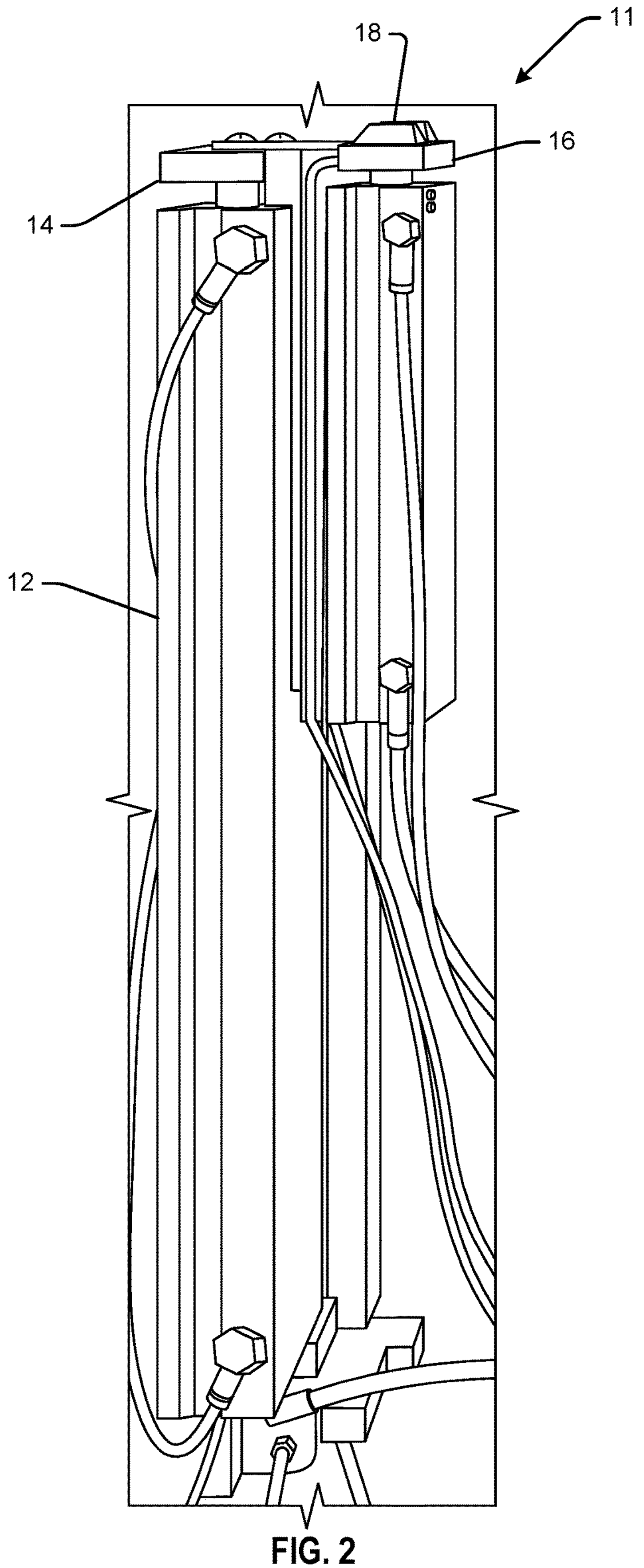
FIG. 2 is a side perspective view of the example automated loading and unloading device in a lowered operating position.
Figure 3:
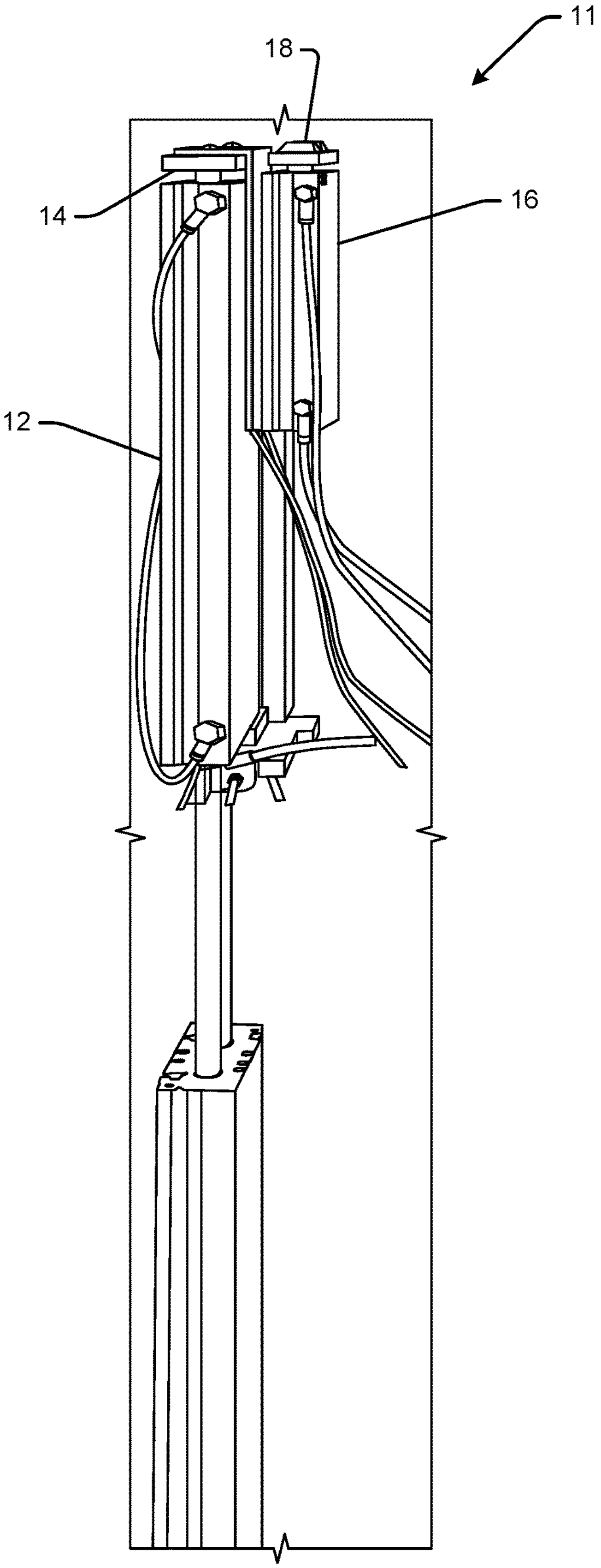
FIG. 3 is a side perspective view of the example automated loading and unloading device from FIG. 2 in a raised operating position.
Figure 4:
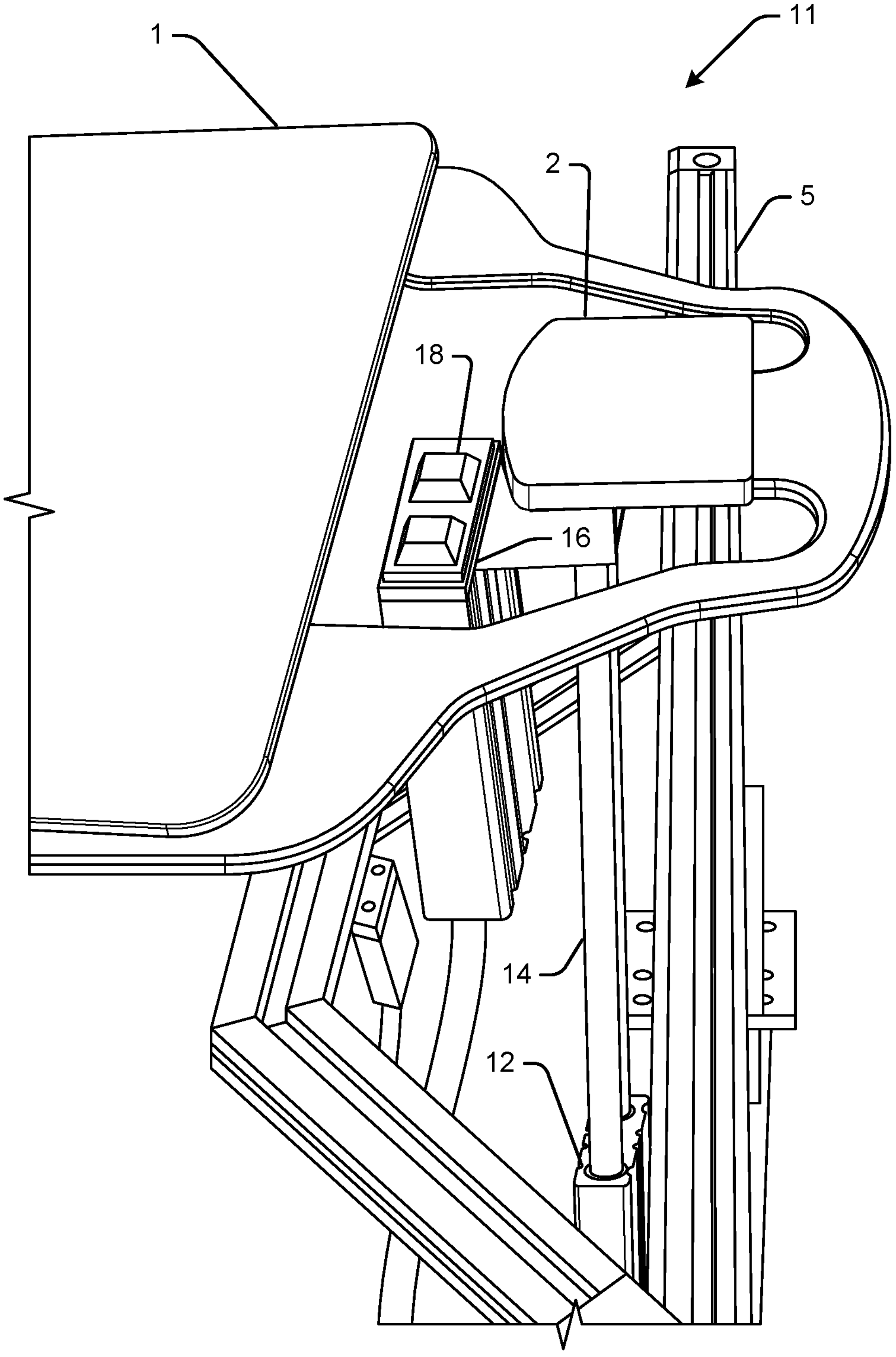
FIGS. 4 and 5 are perspective views of the example automated loading and unloading device illustrating operating positions.
Figure 5:
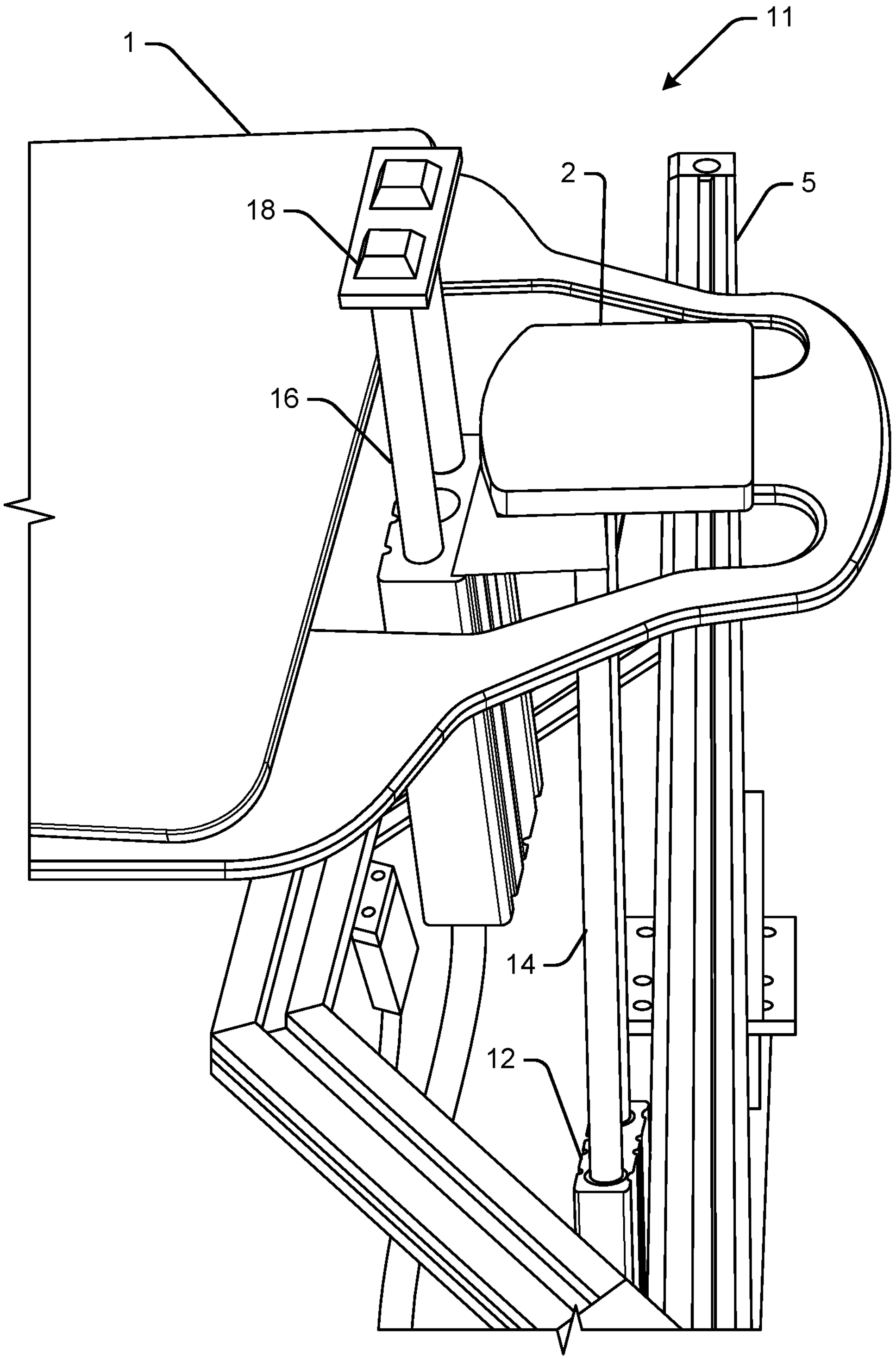
Figure 6:
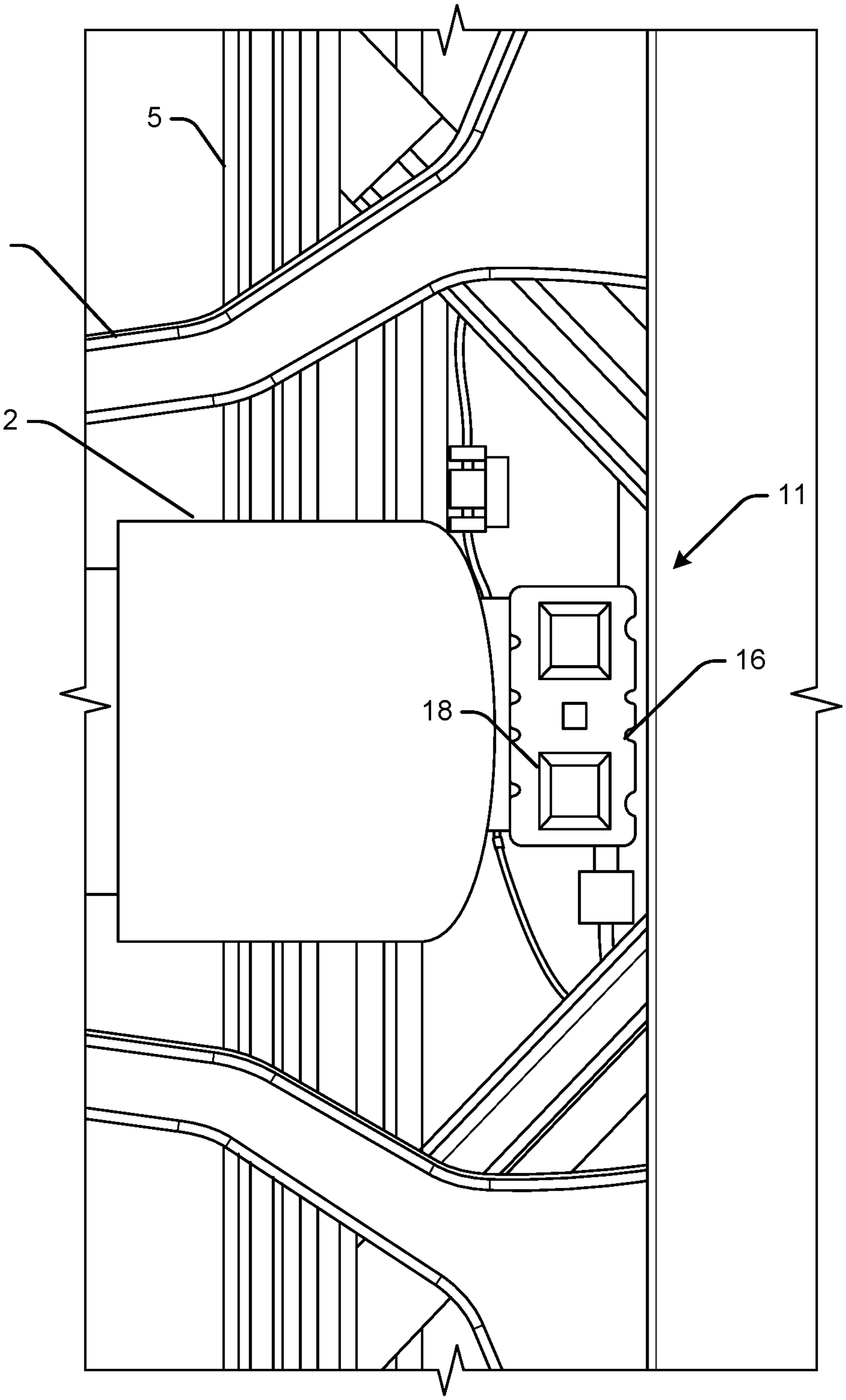
FIG. 6 is a top view of the example automated loading and unloading device.

FIG. 2 is a side perspective view of the example automated loading and unloading device 11 in a lowered operating position. FIG. 3 is a side perspective view of the example automated loading and unloading device 11 from FIG. 2 in a raised operating position. FIGS. 4 and 5 are perspective views of the example automated loading and unloading device 11 illustrating operating positions. FIG. 6 is a top view of the example automated loading and unloading device 11.

An example automated loading and unloading device 11 includes a base 12, a first stage riser 14, and a second stage riser 16. The second stage riser 18 may include a head portion 18. Head portion 18 may include one or more rubber or other coated surface(s) to aid in gripping the textile.

The base 12 is attached to a frame assembly of a printing machine 5. The first stage riser 14 is connected to both the base 12 and to the second stage riser 16. The first stage riser 14 is movable between a first position (illustrated in FIG. 2) and a second position (illustrated in FIGS. 3 and 4). The first stage riser 14 is fully extended in the second position. The second position is higher up than the first position. The first stage riser 14 moves from the first position to the second position to raise the second stage riser 16.

The second stage riser 16 is moveable between the second position (illustrated in FIG. 4) and a third position (illustrated in FIG. 5). The second stage riser 16 is fully extended in the third position. The third position is higher up than the second position. The second stage riser 16 moves from the second position to the third position to load a label area of the textile onto a label printing portion 2 of a pallet 1 in advance of a printing operation in the label area of the textile (e.g., inside neck area of a t-shirt).

In an example, the second stage riser 16 moves back down from the third position to the second position, e.g., to clear the shirt on the pallet 1 during the printing operation.

In an example, the second stage riser 16 also moves back up from the second position to the third position to unload the label area of the textile from the label printing portion of the pallet 5, e.g., after the printing operation in the label area of the textile.

The first stage riser 14 and the second stage riser 16 may be movably connected according to any suitable mechanism. Example mechanisms include mechanical mechanisms (e.g., gear and gear track) or cylinders (e.g., gas or air). The mechanisms may be operated via pneumatic actuators, electrical motors, etc. By way of illustration, the first stage riser 14 is one or more pneumatically operable cylinder that moves between the first position and the second position, and the second stage riser is one or more pneumatically operable cylinder including the head portion 18 that moves between the second position and the third position. However, other suitable mechanisms may be implemented, as will be readily apparent to those having ordinary skill in the art after becoming familiar with the teachings herein.

In an example, a foot pedal 20 (see FIG. 1) may be provided as a manual actuator. For example, the foot pedal 20 may be operated by the operator to move the first stage riser 14 between the first position and the second position. The same, or a separate foot pedal 14 may also be operated by the operator to move the second stage riser 16 between the second position and the third position.

Actuating mechanisms (e.g., drive motors and/or pneumatics) may be fully and/or partially manual (e.g., foot pedal 20) and/or automatic. While a foot pedal 20 may be provided to free the user's hands, other manual actuators (e.g., a push button) may also be provided.

In an example, at least one sensor may be provided to at least partially automate movement. Manual triggers and/or overrides may also be provided. The sensors may be implemented to at least partially, and perhaps fully, automate operation of the loading and unloading system 10.

Any suitable sensor(s) may be implemented. In an example, the sensor(s) may include a light and/or motion sensor. The sensor(s) may feed input to an actuator to move the first stage riser 14 between the first position and the second position. The same or another light and/or motion sensor may feed input to an actuator to move the second stage riser 16 between the second position and the third position.

Figure 7:
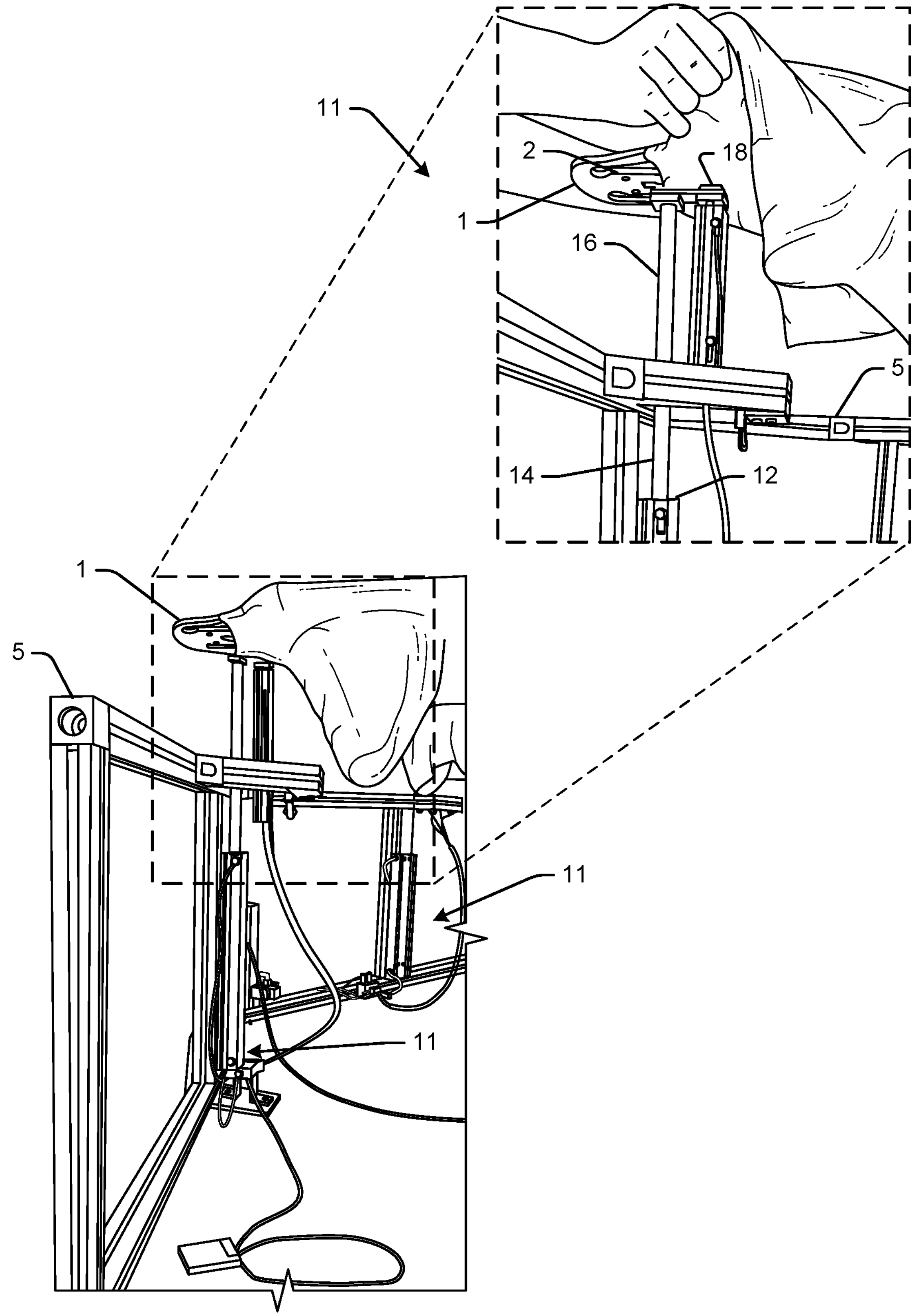
FIGS. 7-8 are lower perspective views of the example automated loading and unloading device illustrating a shirt loading operation.
Figure 8:
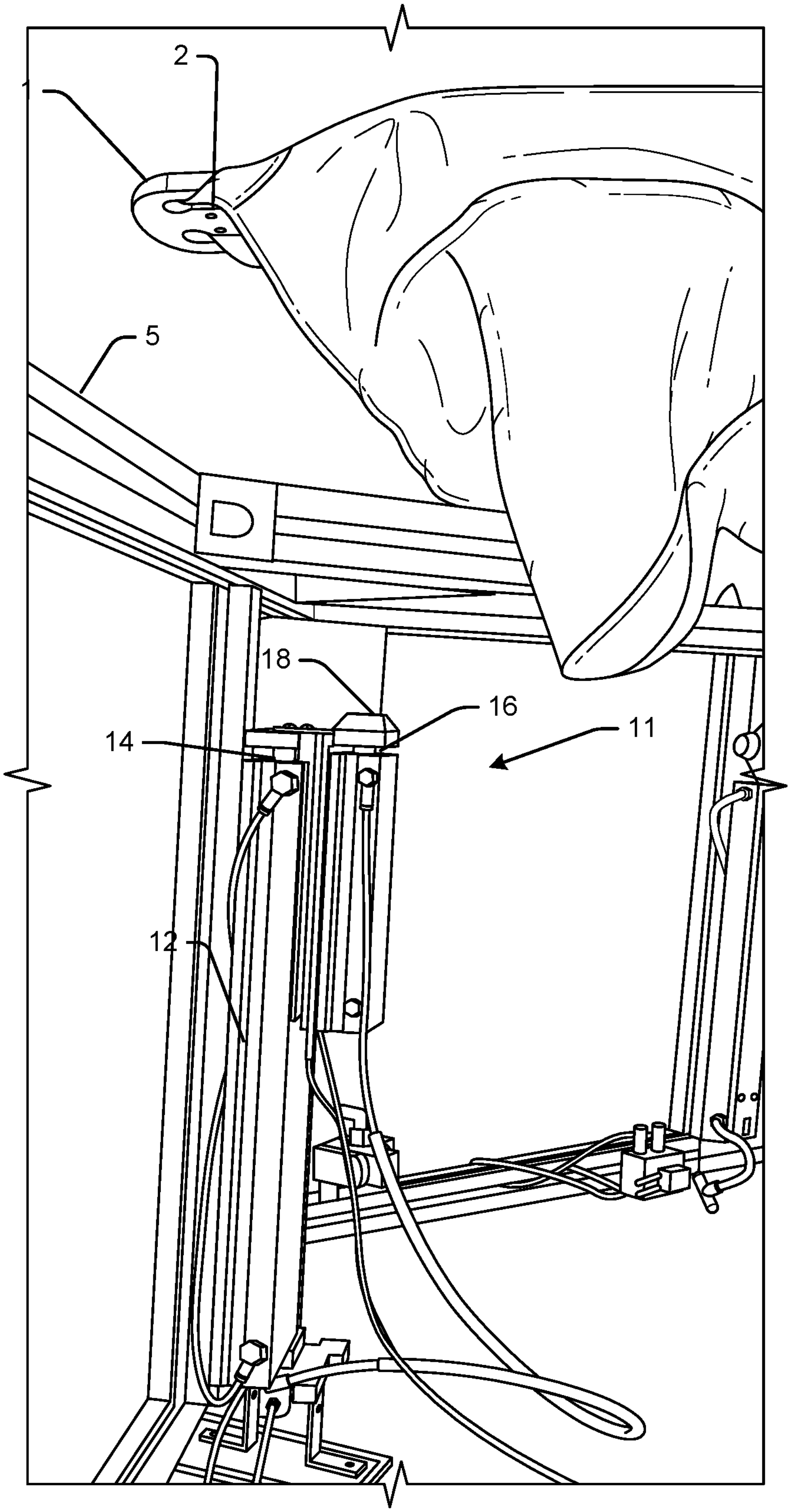
Figure 9:
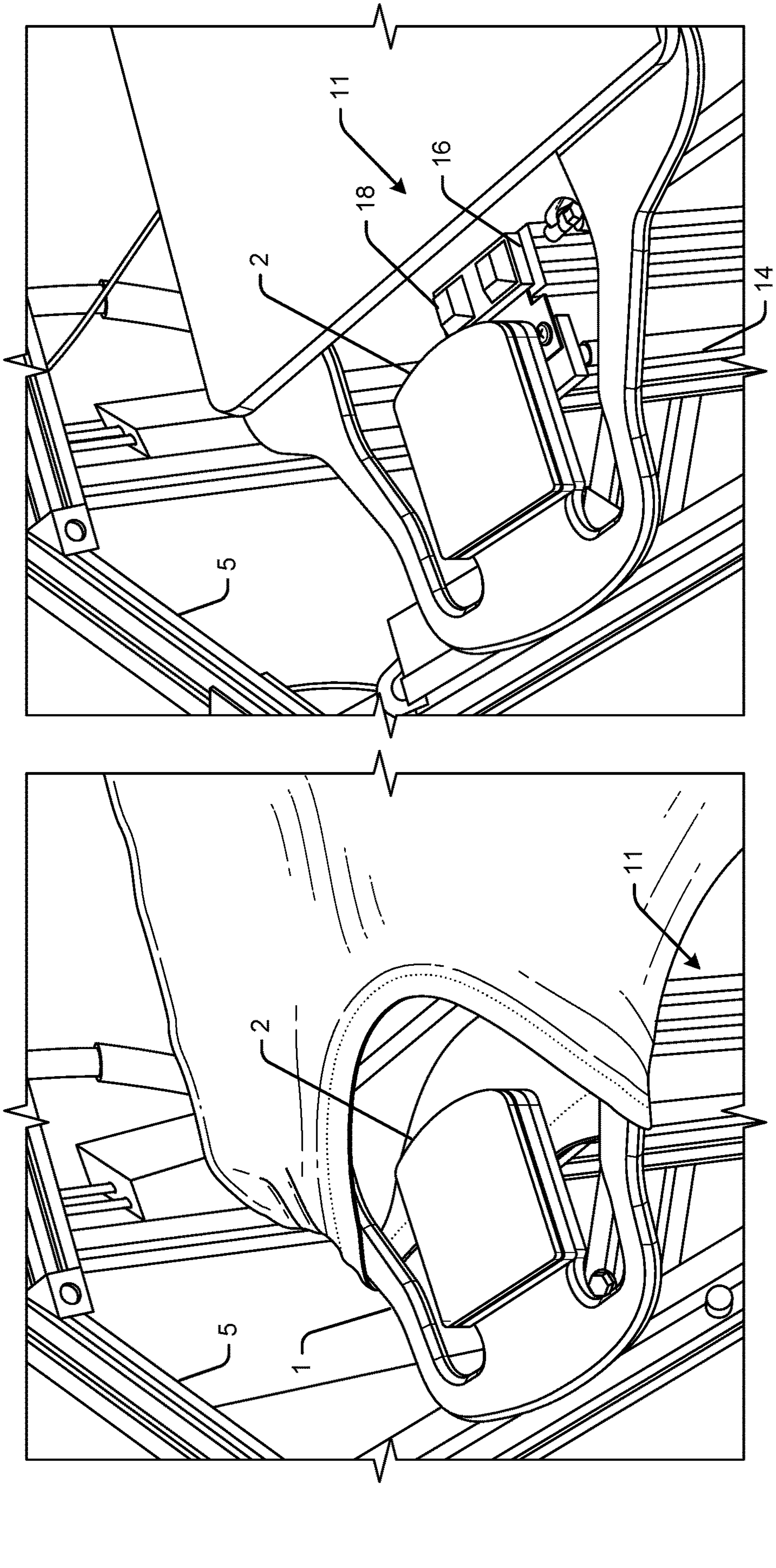
FIGS. 9-10 are upper perspective views of the example automated loading and unloading device illustrating a shirt loading operation.
Figure 10:
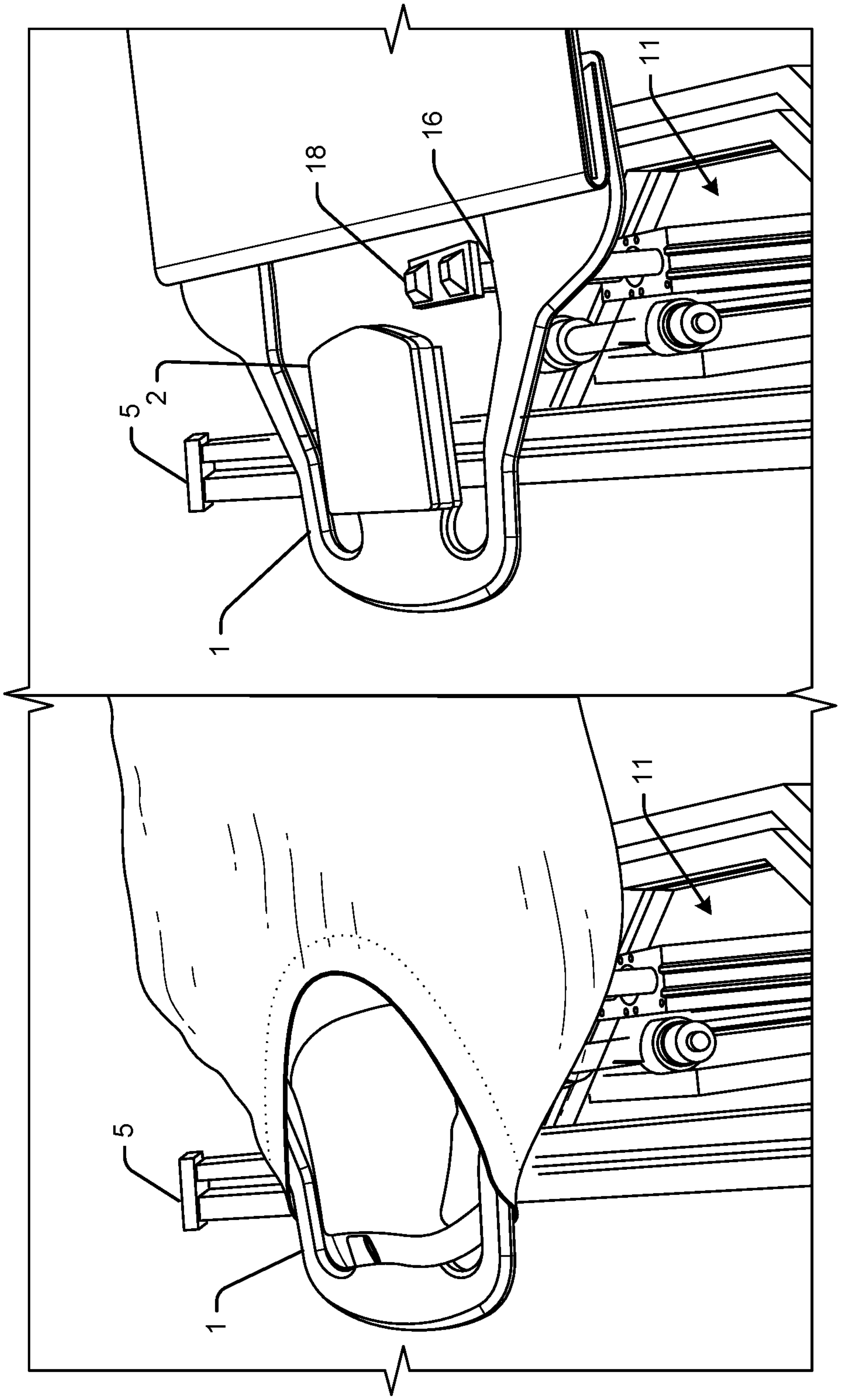

The example automated loading and unloading device 10 may be implemented to load and unload a shirt during a printing operation on the printing machine 5. FIGS. 7-8 are lower perspective views of the example automated loading and unloading device 11 illustrating a shirt loading operation. FIGS. 9-10 are upper perspective views of the example automated loading and unloading device illustrating a shirt loading operation. The operations shown and described herein are provided to illustrate example implementations. It is noted that the operations are not limited to the ordering shown. Still other operations may also be implemented.

In an example, the first stage riser 14 moves up from the first position to the second position when the pallet 1 is moved over the base 12 with the first stage riser 14 and the second stage riser 16. By way of illustration, one or more sensors may indicate that the pallet 1 has been moved over the base 12 of device 11.

In an example, the second stage riser 16 moves up from the second position to the third position when the textile (e.g., a t-shirt) is loaded onto the pallet 1 above the second stage riser 16. By way of illustration, one or more sensors may indicate that the textile is loaded onto the pallet 1 and the pallet is above the second stage riser 16.

In an example, the second stage riser 16 returns down from the third position back to the second position after the label area of the textile is loaded onto the label printing portion 2 of the pallet 1. The return operation may be triggered manually and/or automatically. For example, a sensor may indicate that the textile is in a loaded position. Or for example, the second stage riser 16 may simply return automatically as part of the operation. In another example, a timer or other mechanism may be implemented.

In an example, the first stage riser 14 returns down from the second position to the first position after the label area of the textile is loaded onto the label printing portion 2 of the pallet 1. The return operation may be triggered manually and/or automatically. For example, a sensor may indicate that the textile is in a loaded position on the pallet 1. Or for example, the first stage riser 14 may simply return automatically as part of the operation. In another example, a timer or other mechanism may be implemented.

Figure 11:
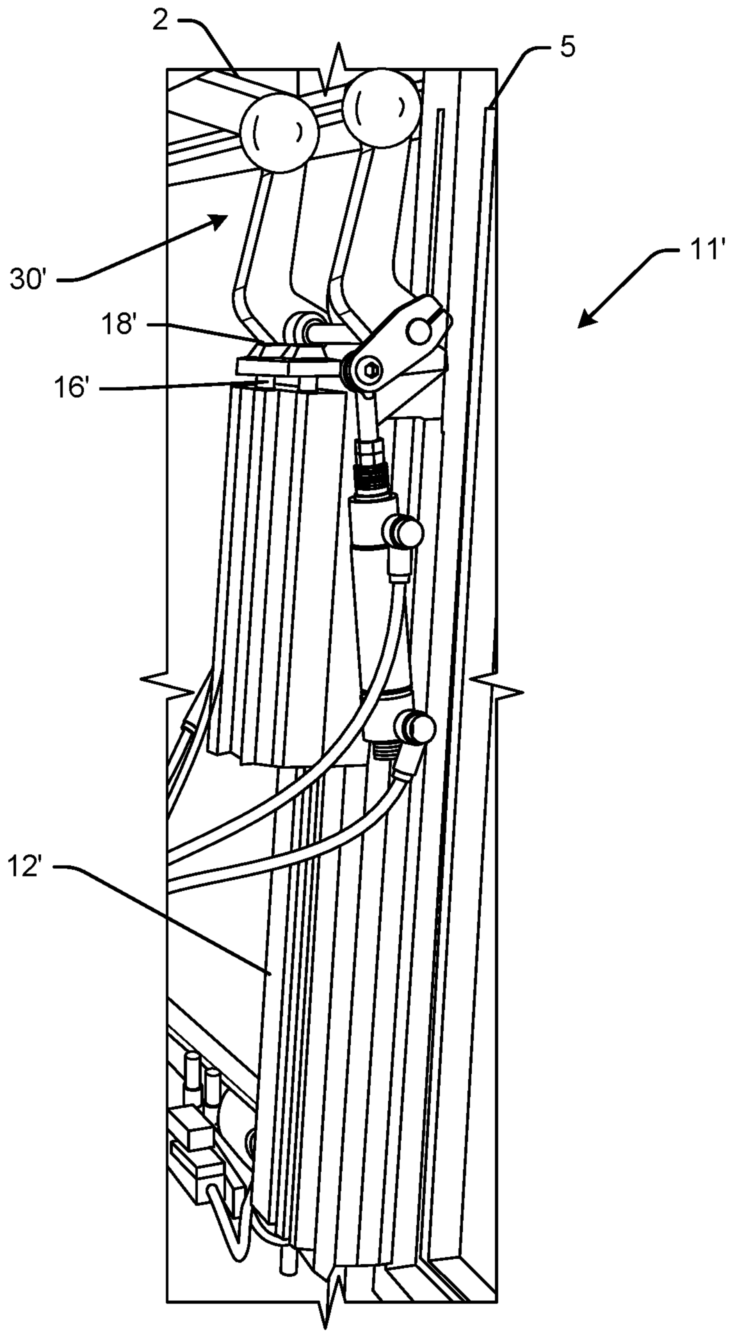
FIG. 11 is a side perspective view of another example automated loading and unloading device in a lowered operating position.
Figure 12:
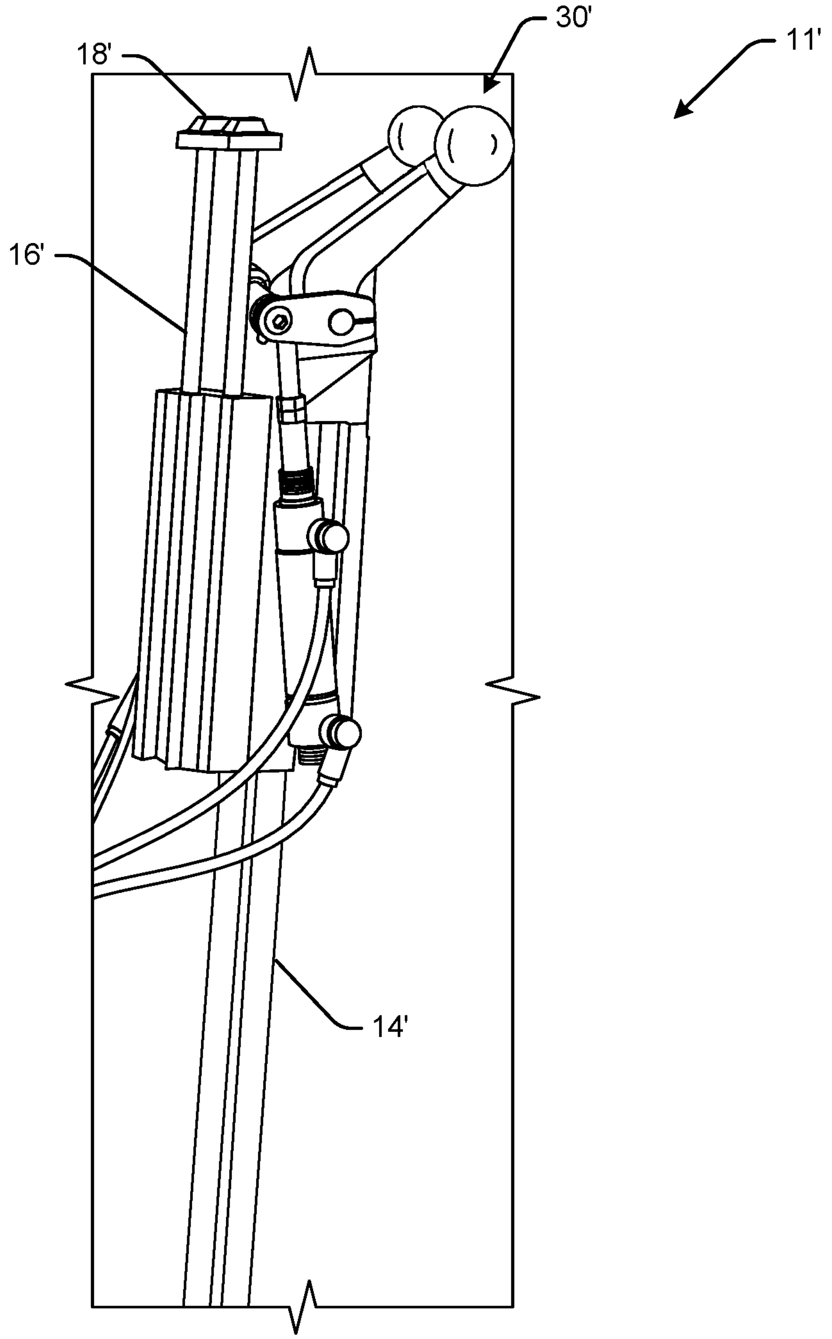
FIG. 12 is a side perspective view of the example automated loading and unloading device from FIG. 11 in a raised operating position.

FIG. 11 is a side perspective view of another example automated loading and unloading device 11' in a lowered operating position. FIG. 12 is a side perspective view of the example automated loading and unloading device 11' from FIG. 11 in a raised operating position.

It is noted that similar reference numbers are used to describe the example automated loading and unloading device 11' (using the prime designation) as were already described for the example automated loading and unloading device 11. These components may not be described again here for brevity.

The example automated loading and unloading device 11' includes a base 12', a first stage riser 14', and a second stage riser 16'. The first stage riser 14' is connected to the base 12' and to the second stage riser 16'.

As discussed above with reference to the automated loading and unloading system 10, the first stage riser 14' is movable between a first position and a second position that is higher than the first position. The first stage riser moves from the first position to the second position to raise the second stage riser 16'. The second stage riser 16' is moveable between the second position and a third position that is higher than the second position. The second stage riser 16' moves from the second position to the third position to load a label area of the textile onto a label printing portion 2 of a pallet 1 in advance of a printing operation in the label area of the textile.

In an example, the automated loading and unloading device 11' includes a finger assembly 30'. The finger assembly 30' may be rotatably mounted to the second stage riser 16' to automatically rotate upon operation of the second stage riser 16'. In an example, the finger assembly 30' rotates between a forward position and a rearward position.

Figure 13:
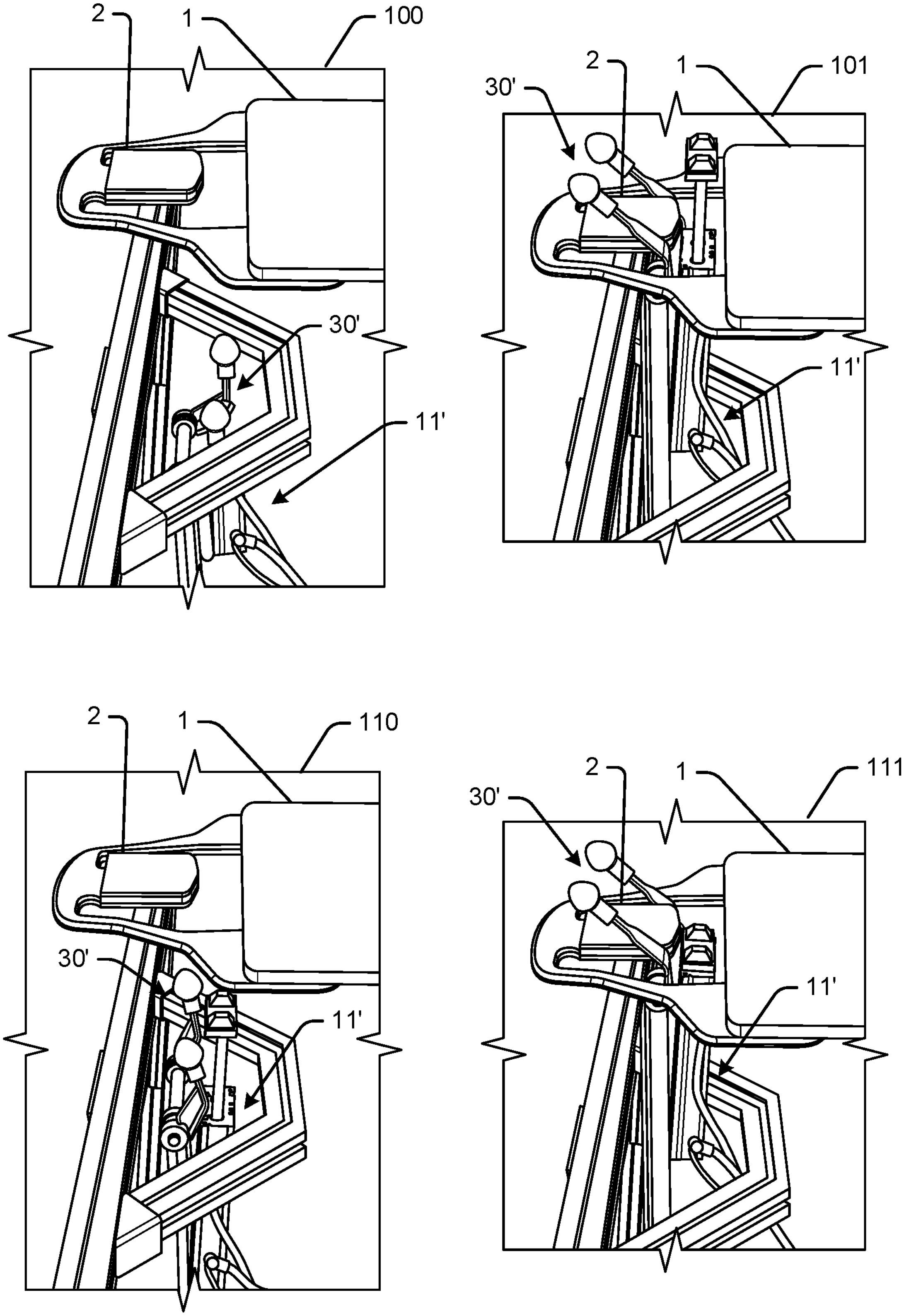
FIG. 13 shows perspective views of the example automated loading and unloading device illustrating operating positions.
Figure 14:
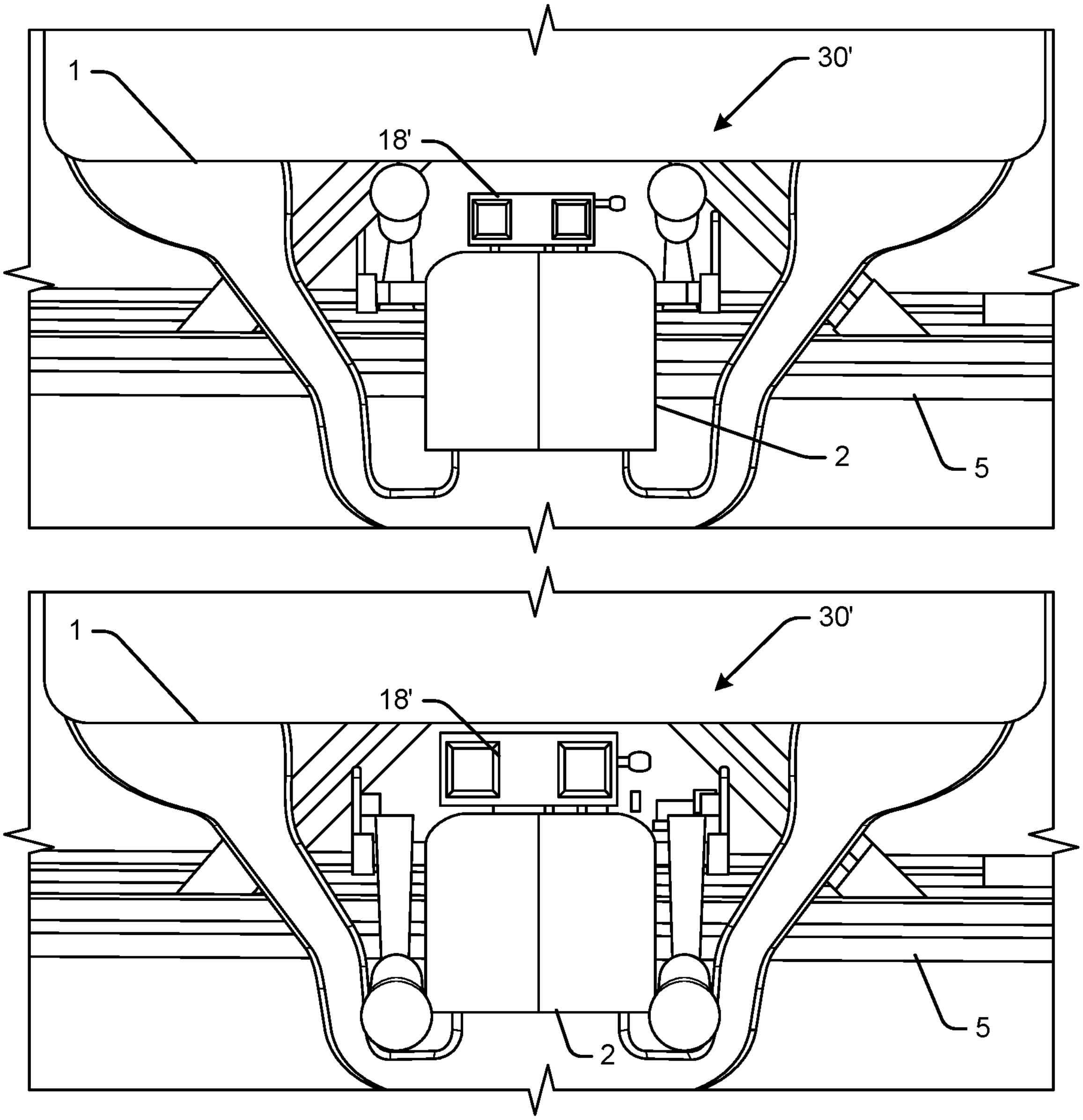
FIG. 14 shows top views of the example automated loading and unloading device illustrating operating positions.

The example automated loading and unloading device 11' may be implemented to load and unload a shirt during a printing operation. FIG. 13 shows perspective views of the example automated loading and unloading device 11' illustrating operating positions. FIG. 14 shows top views of the example automated loading and unloading device 11' illustrating operating positions.

The operations shown and described herein are provided to illustrate example implementations. It is noted that the operations are not limited to the ordering shown. Still other operations may also be implemented.

During an example loading operation (illustrated by positions 100 and 101 in FIG. 13), the finger assembly 30' rotates from the rearward position (also illustrated in FIG. 11) to the forward position (also illustrated in FIG. 12) to grasp the neck of the shirt and load a label area of the shirt or other textile onto the label printing portion of the pallet 1 in advance of the printing operation. The finger assembly 30' then rotates from the forward position (also illustrated in FIG. 12) back to the rearward position (also illustrated in FIG. 11). In an example, the second stage riser moves back from the third position to the second position to clear the pallet during the printing operation in the label area of the textile.

In an example, the second stage riser 16 moves back from the second position to the third position to unload the label area of the textile from the label printing portion 2 of the pallet 1 after the printing operation in the label area of the textile.

During an example unloading operation (positions 110 and 111 in FIG. 13), the finger assembly 30' rotates from the rearward position (also illustrated in FIG. 11) to the forward position (also illustrated in FIG. 12) and then grasps the neck of the shirt or other textile to remove it from the label printing portion of the pallet 1 after the printing operation. The finger assembly 30' then rotates from the forward position (also illustrated in FIG. 12) back to the rearward position (also illustrated in FIG. 11) stripping the neck of the shirt from the label printing portion 2 of the pallet 1.

Figure 15:
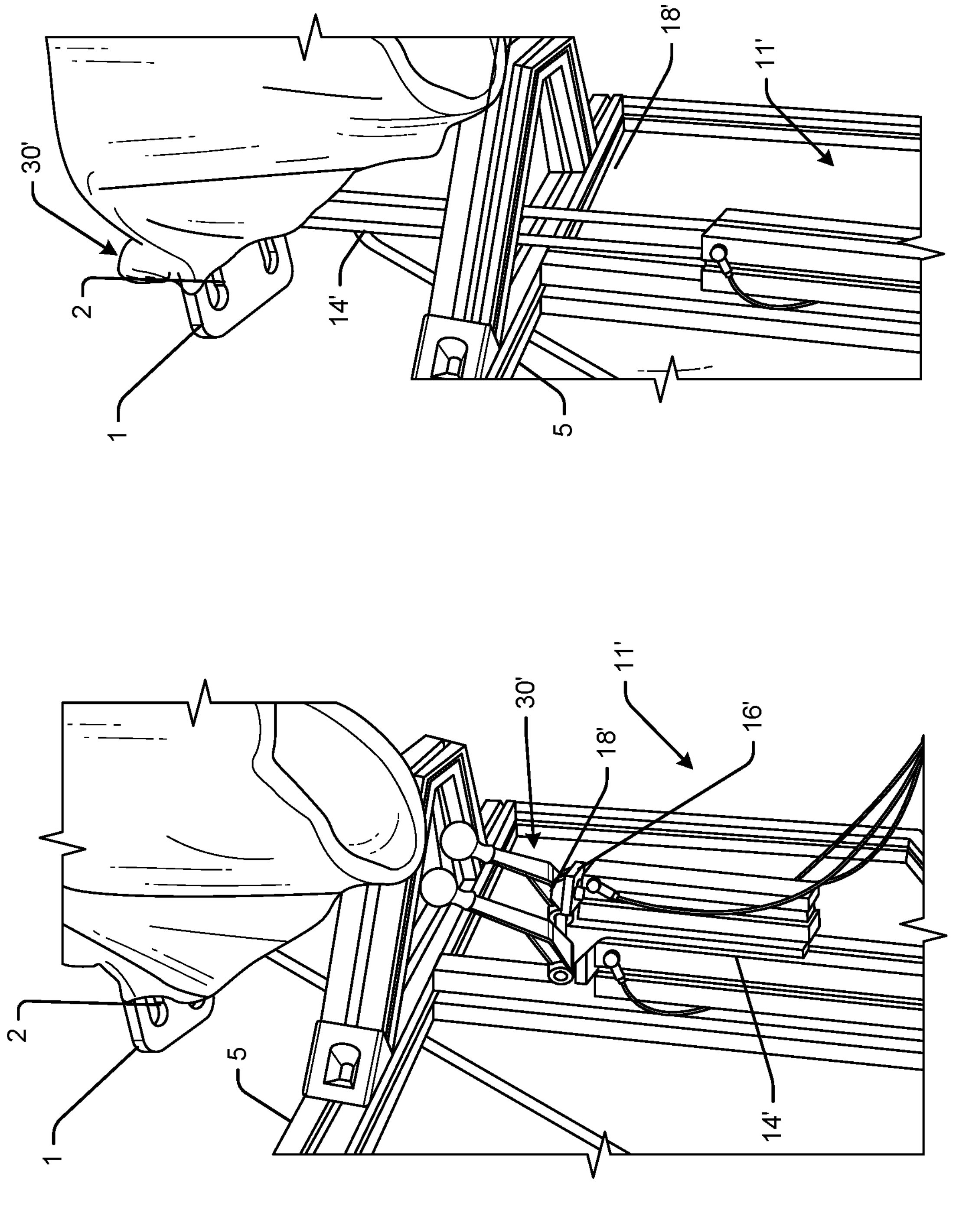
FIGS. 15-18 are perspective views of the example automated loading and unloading device illustrating a shirt unloading operation.

FIGS. 15-18 are perspective views of the example automated loading and unloading device 11' illustrating a shirt unloading operation. FIG. 15 is a lower perspective view showing the example automated loading and unloading device 11' traveling up and engaging with the shirt to position the neck area of the shirt over the label printing portion 2 of the pallet 1.

Figure 16:
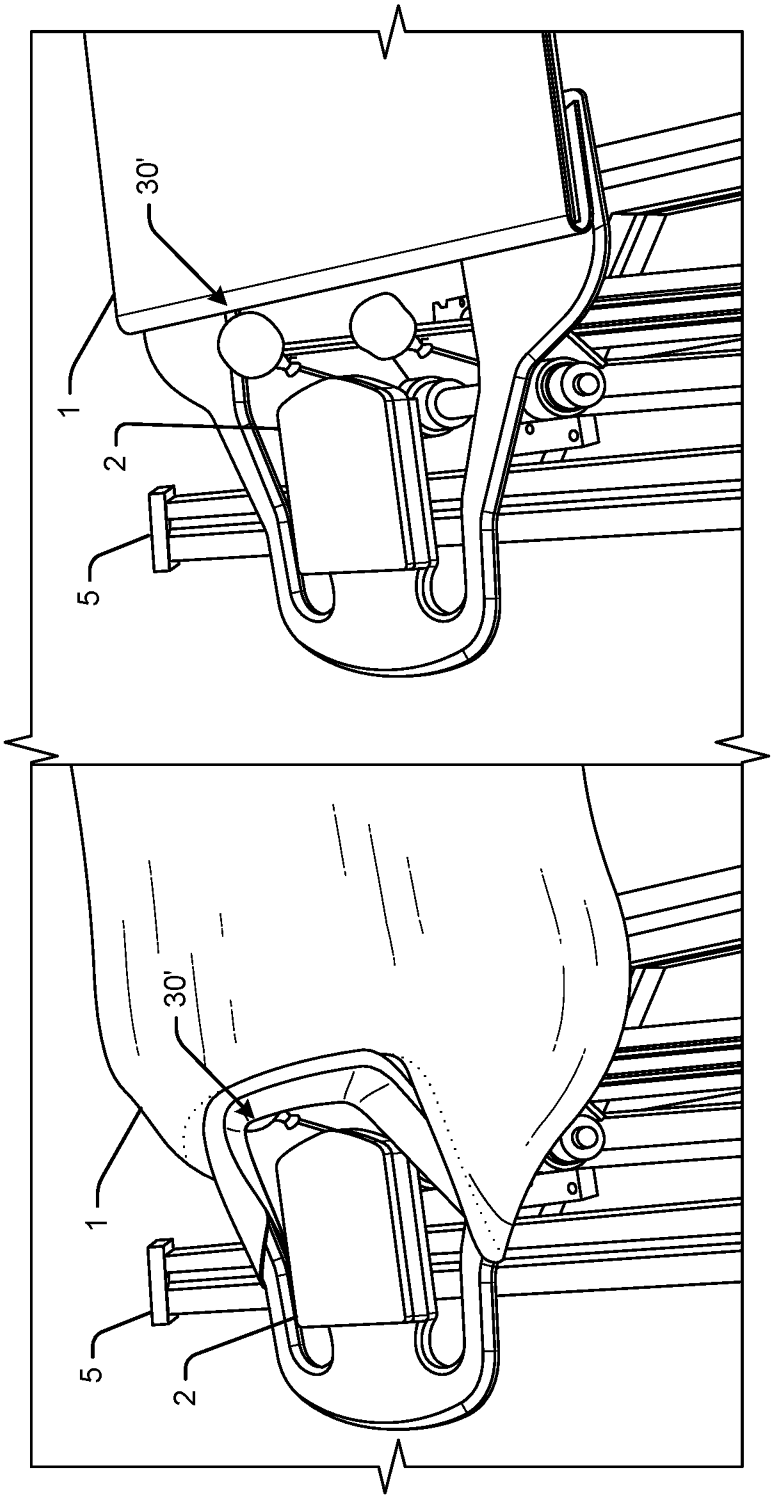
Figure 17:
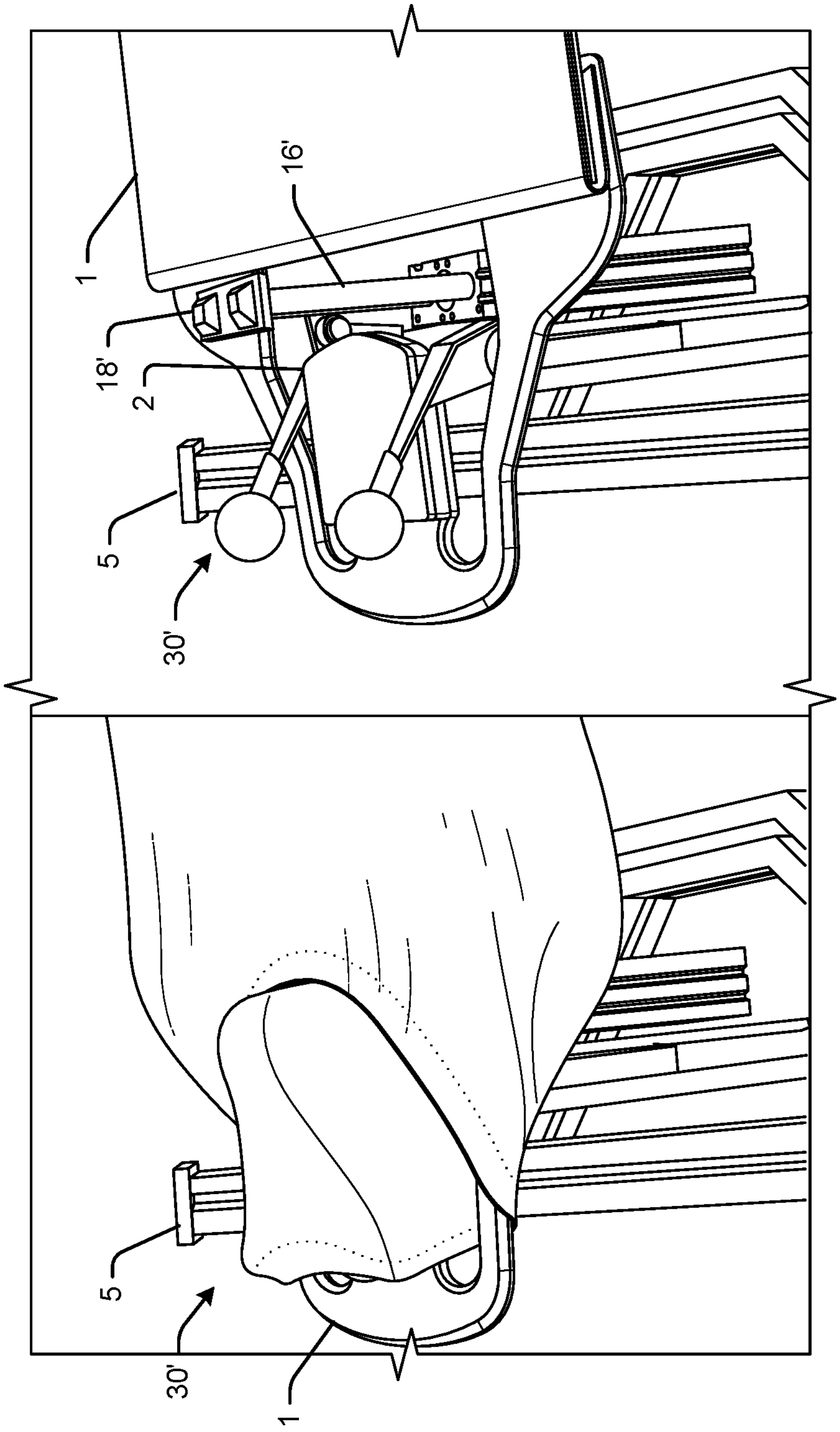
Figure 18:
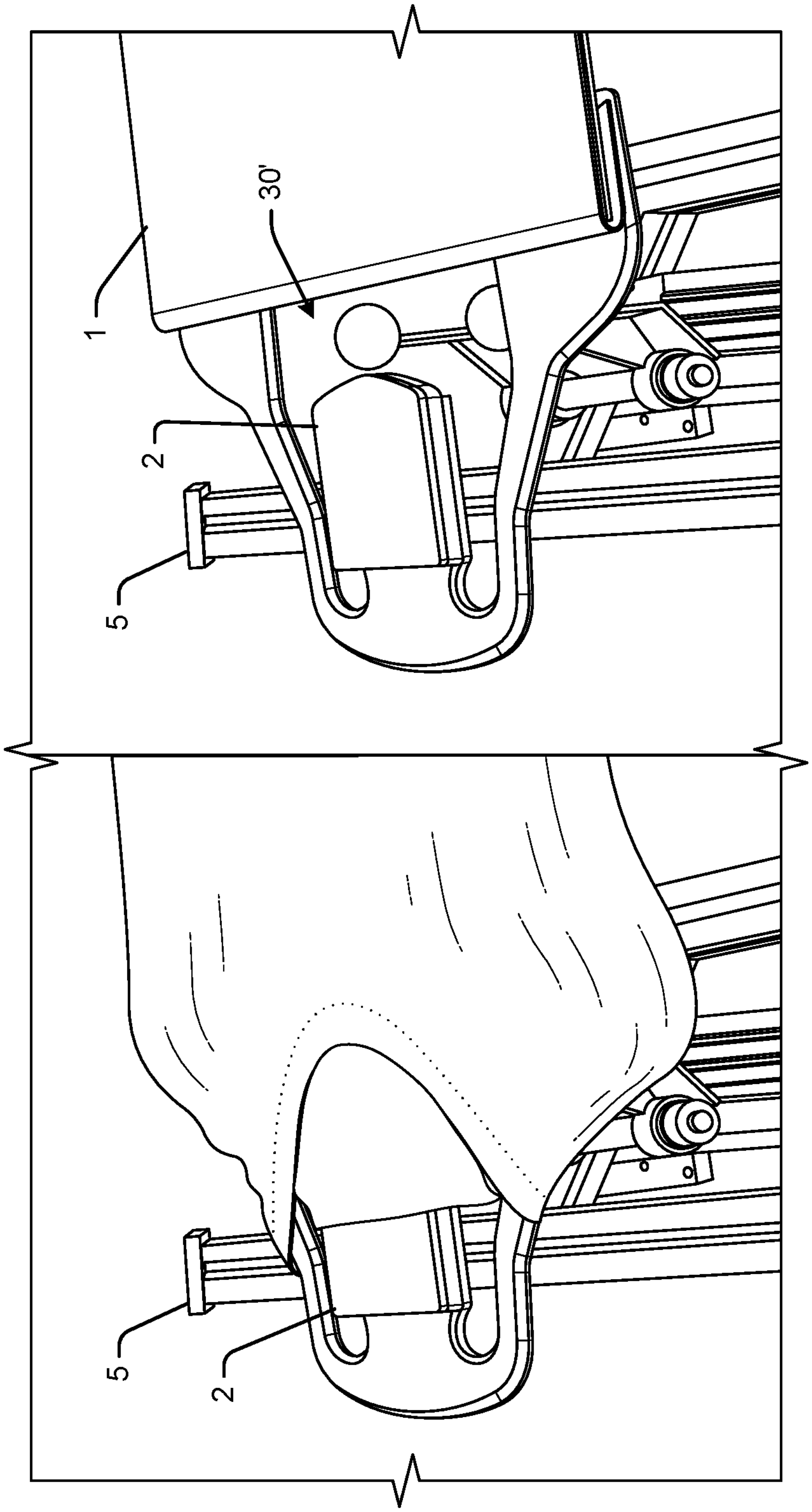

FIGS. 16-18 are upper perspective views showing (left side) a shirt being loaded onto the label printing portion 2 of the pallet 1. The right side of FIGS. 16-18 corresponds to the left side view, but with the shirt removed to show corresponding operation of the example automated loading and unloading device 11'. In FIG. 16, the finger assembly 30' is shown rising and grasping the neck area of the shirt. In FIG. 17, the finger assembly 30' is shown pulling the neck area of the shirt over the label printing area 2 of the platen 1. In FIG. 18, the finger assembly 30' is shown retreating so that the finger assembly 30' does not interfere with the print operation.

It is noted that viewing these Figures in reverse order (e.g., FIG. 18, then FIG. 17, and then FIG. 16) illustrates an unloading operation.

Figure 19:
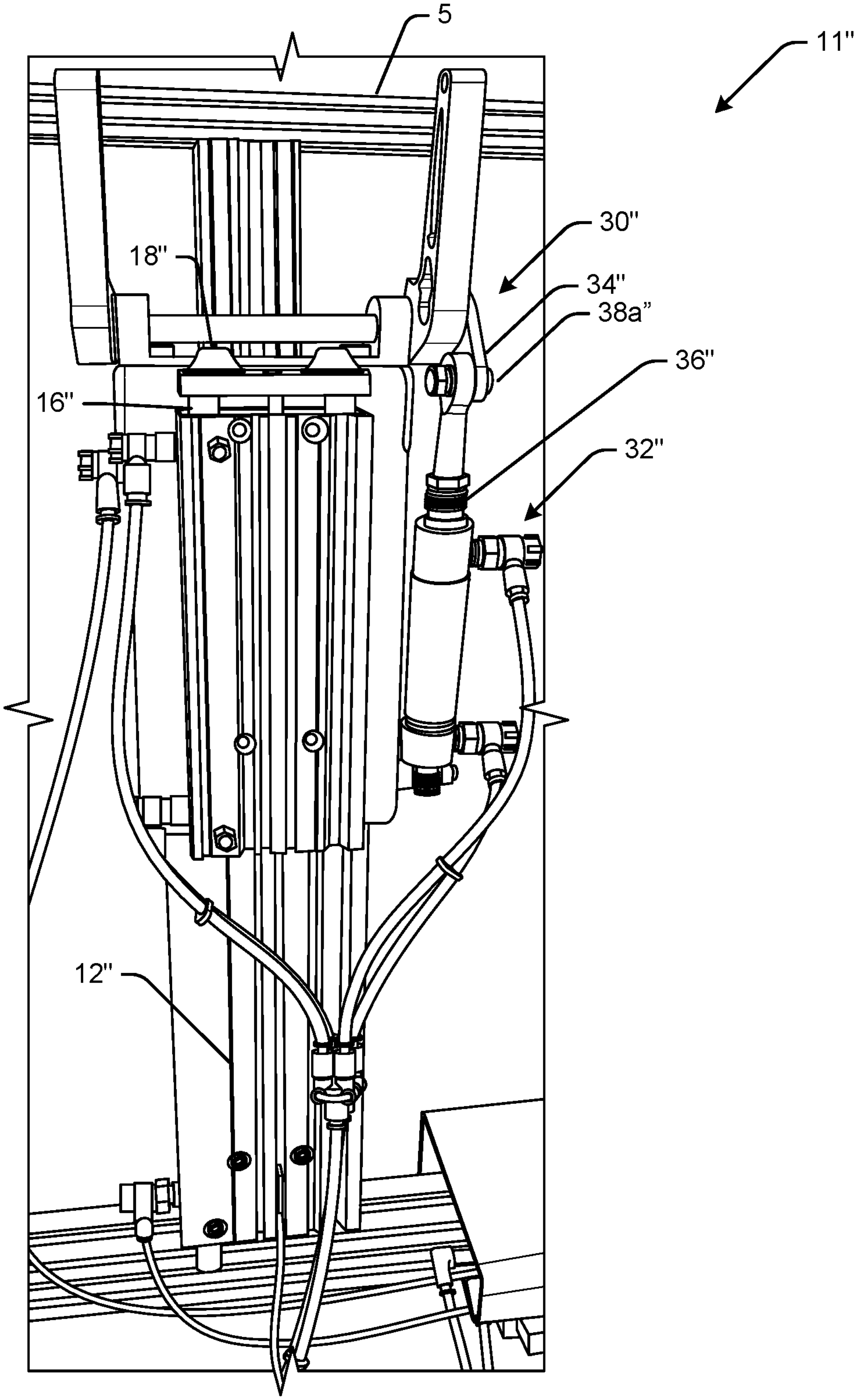
FIGS. 19 and 20 are perspective views of another example automated loading and unloading device.
Figure 20:
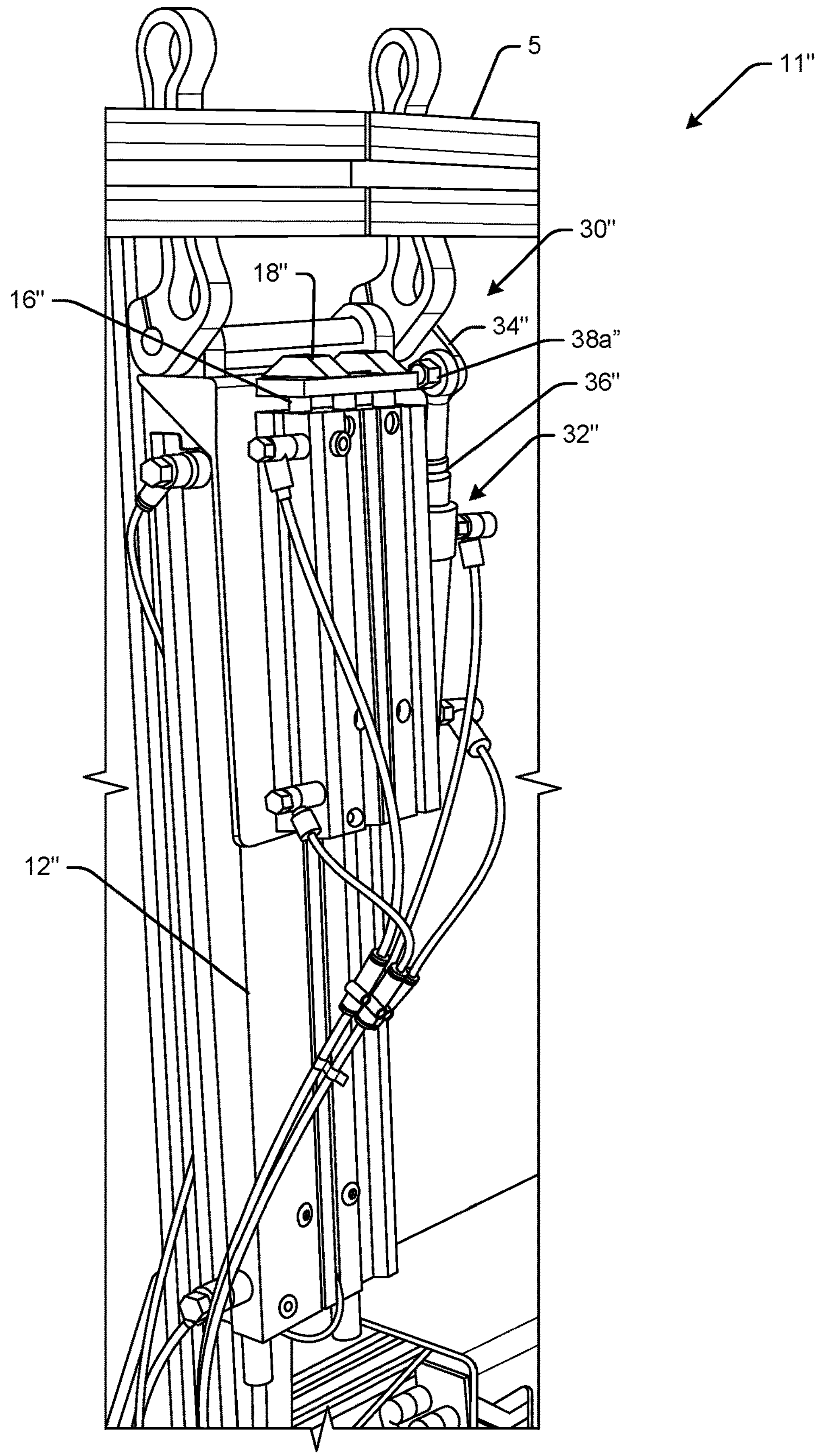
Figure 21:
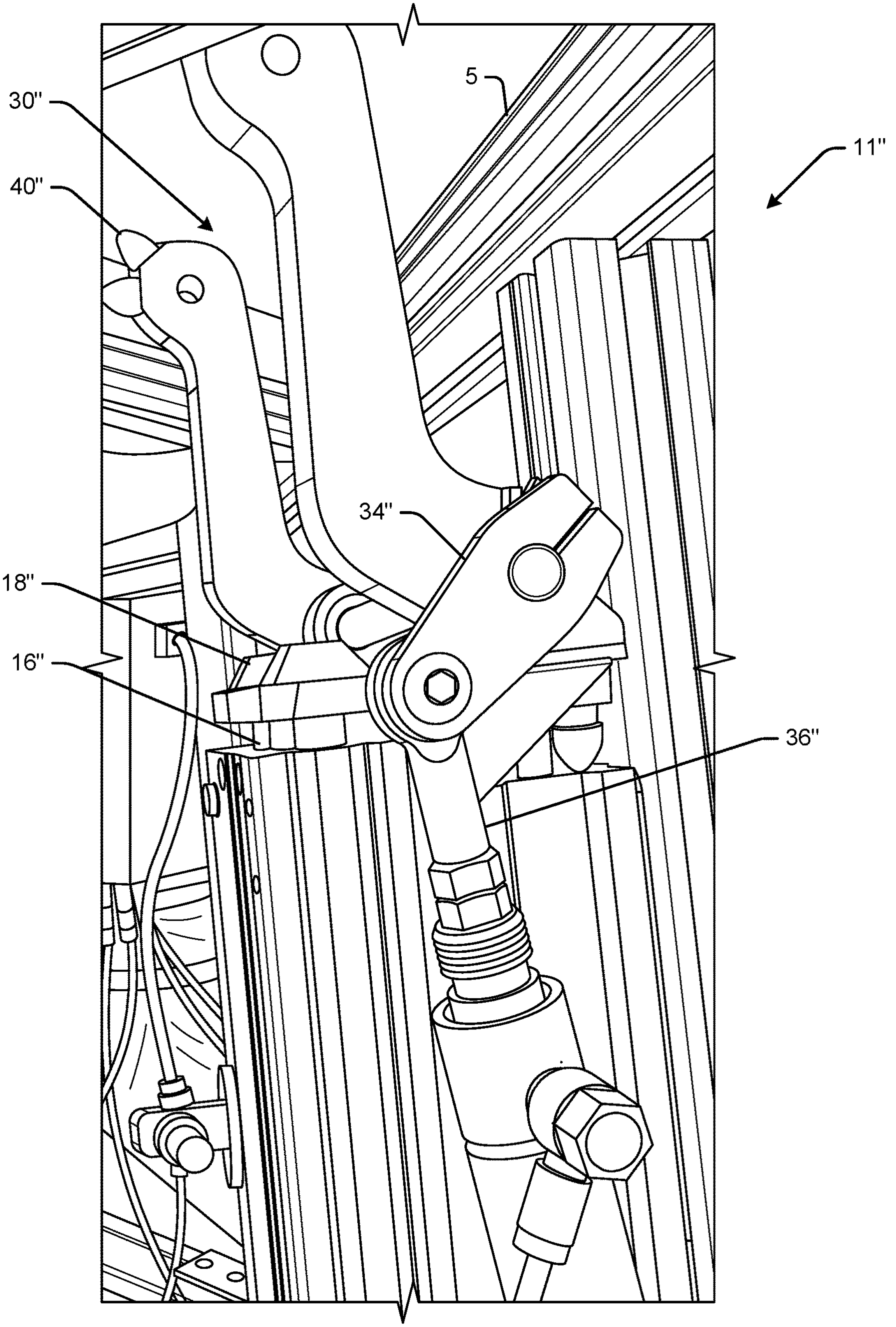
FIGS. 21 and 22 are close-up perspective views showing operation of the finger assembly of the example automated loading and unloading device shown in FIGS. 19 and 20.
Figure 22:
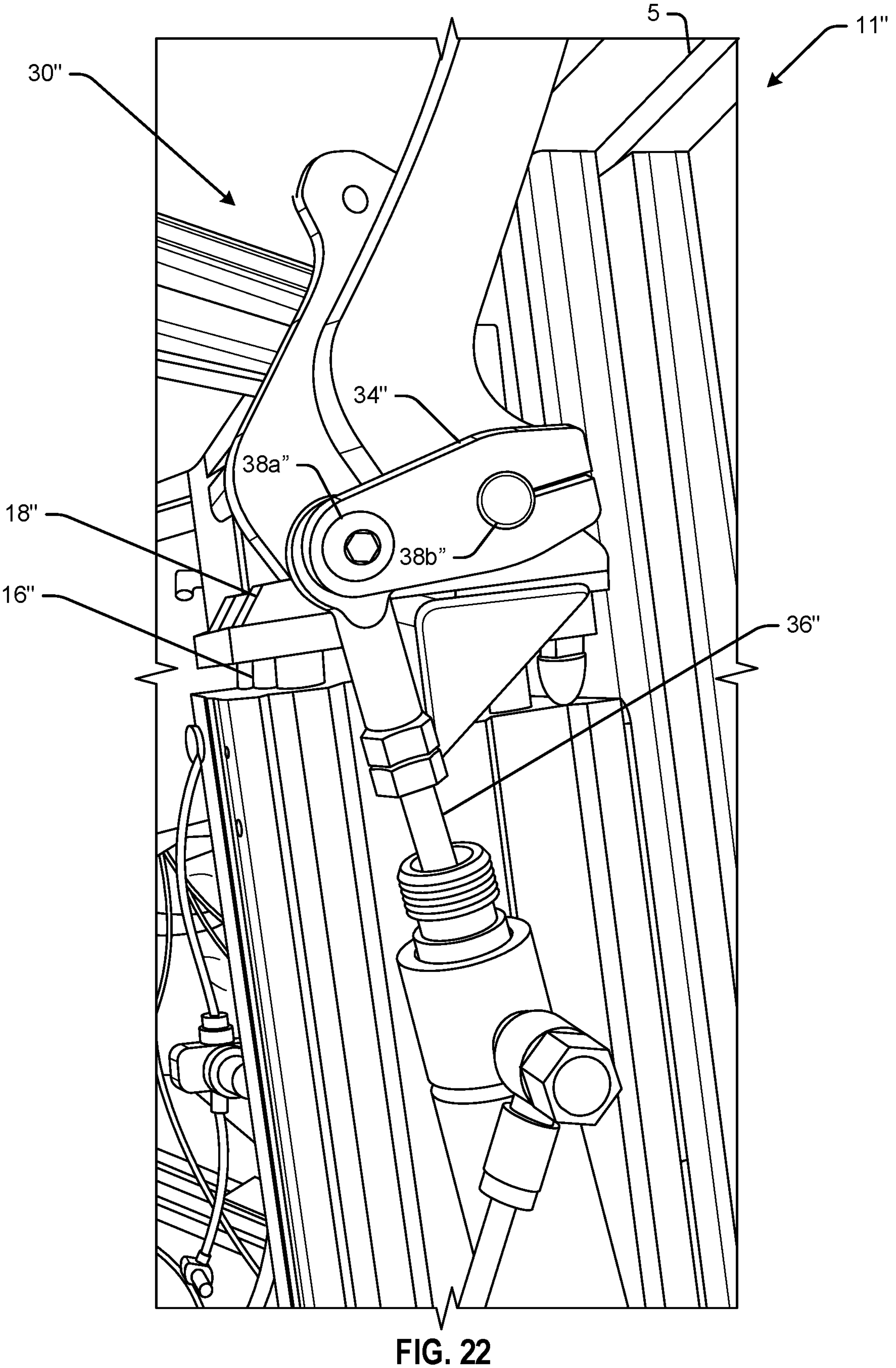

FIGS. 19 and 20 are perspective views of another example automated loading and unloading device 11". FIGS. 21 and 22 are close-up perspective views showing operation of the finger assembly 30" of the example automated loading and unloading device 11" shown in FIGS. 19 and 20.

It is noted that similar reference numbers are used to describe the example automated loading and unloading device 11" (using the prime designation) as were already described for the example automated loading and unloading devices 11 and 11'. These components may not be described again here for brevity.

The example automated loading and unloading device 11" includes a base 12", a first stage riser 14", and a second stage unloading riser 36" (which may be separate from the second stage loading riser 16"). The first stage riser 14" is connected to the base 12" and to the second stage riser 16". Unloading riser 36" may be separately operable from the second stage loading riser 16". In this example, the head portion is integral with and formed as part of the finger assembly 30".

Operation is similar to that already described above, e.g., for finger assembly 30' of example automated loading and unloading device 11'. In FIGS. 19-22, however, a pneumatic cylinder 32" is better seen to understand an example rotational operation of the finger assembly 30".

In an example, after the first stage riser 14" moves up from the first position to the second position, the second stage unloading riser 36" (which may be separate from the second stage loading riser 16") moves up from the second position to the third position. This upward movement of the second stage riser 36" also pushes connector 34" upward and causes a pivoting motion at points **38*a*" and 38*b*", thereby rotating the finger assembly 30", as seen going from FIG. 21 to FIG. 22. The finger assembly 30" rotates in the reverse direction as the second stage unloading riser 36" retreats in a downward direction, e.g., as seen going from FIG. 22 to FIG. 21. It is also noted in FIG. 21, that rubber, silicon, or other "gripping" aids 40" may be provided. Gripping aids 40"** may be provided to enhance contact with the shirt or other textile.

The finger assembly 30" rotates from the rearward position (FIG. 21) to the forward position (FIG. 22) to load a label area of the textile onto the label printing portion 2 of the pallet 1 in advance of the printing operation in the label area of the textile. The finger assembly 30" rotates from the forward position (FIG. 22) to the rearward position (FIG. 21) to unload a label area of the textile from the label printing portion 2 of the pallet 1 after a printing operation in the label area of the textile.

Figure 23:
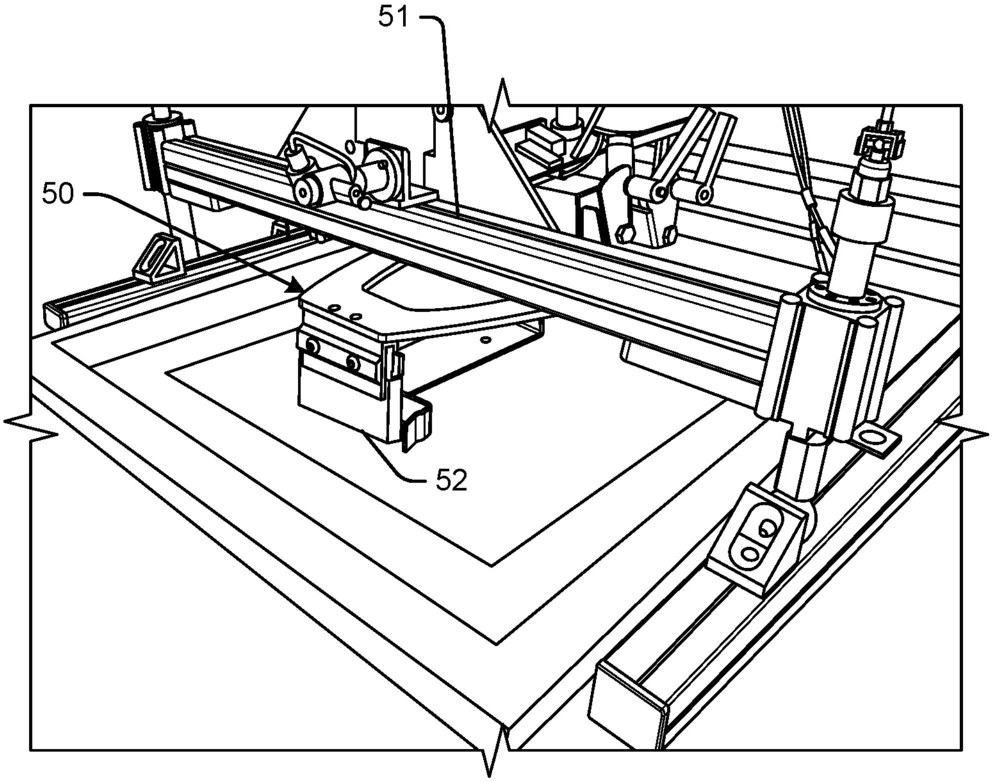
FIGS. 23 and 24 are perspective views of an example printhead adapter for printing neck tags which may be implemented with the automated loading and unloading device.
Figure 24:
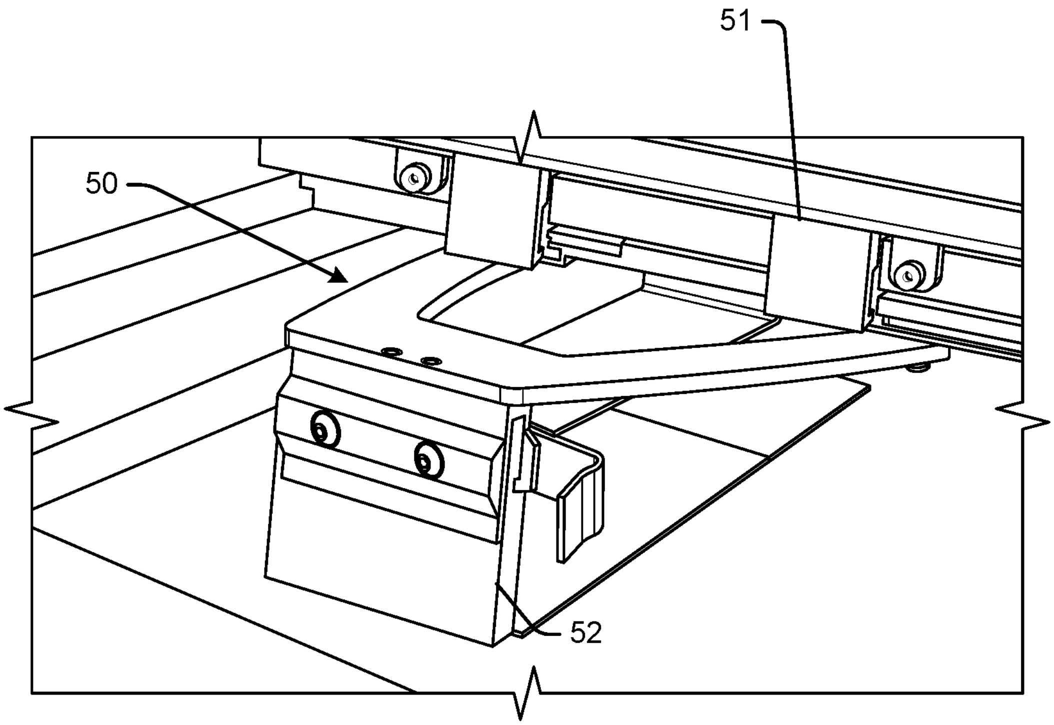

FIGS. 23 and 24 are perspective views of an example printhead adapter 50 for printing neck tags which may be implemented with the automated loading and unloading devices described herein. FIG. 24 is a close-up view of the adapter 50 shown in FIG. 23. The example printhead adapter 50 may be mounted to the squeegee arm 51 that moves the squeegee 52 back and forth in the label printing area (e.g., inside neck area) of the textile (e.g., a t-shirt). An example printhead adapter 50 is configured or extended to reach the label printing portion 2 of the pallet 1 for printing on the label area of the textile.

It is noted that the examples shown and described are provided for purposes of illustration and are not intended to be limiting. Still other examples are also contemplated.

The invention claimed is:

1. An automated loading and unloading system for textile printing, comprising:

a base; and a first stage riser and a second stage riser, the first stage riser connected to the base and to the second stage riser;

wherein the first stage riser is movable between a first position and a second position that is higher than the first position, and the second stage riser is moveable between the second position and a third position that is higher than the second position;

wherein the first stage riser moves from the first position to the second position to raise the second stage riser;

wherein the second stage riser moves from the second position to the third position to load a label area of the textile onto a label printing portion of a pallet in advance of a printing operation in the label area of the textile.

2. The automated loading and unloading system of claim 1, wherein the second stage riser moves back from the third position to the second position to clear the pallet during the printing operation in the label area of the textile.

3. The automated loading and unloading system of claim 2, wherein the second stage riser moves back from the second position to the third position to unload the label area of the textile from the label printing portion of the pallet after the printing operation in the label area of the textile.

4. The automated loading and unloading system of claim 1, wherein the base is attached to a frame assembly of a printing machine.

5. The automated loading and unloading system of claim 1, wherein the first stage riser is pneumatically operable to move between the first position and the second position, and the second stage riser is pneumatically operable to move between the second position and the third position.

6. The automated loading and unloading system of claim 1, wherein further comprising a foot pedal to move at least one of the first stage riser between the first position and the second position, and second stage riser between the second position and the third position.

7. The automated loading and unloading system of claim 1, further comprising at least one sensor to automatically actuate movement of at least one of the first stage riser between the first position and the second position, and the second stage riser between the second position and the third position.

8. The automated loading and unloading system of claim 1, wherein the first stage riser moves up from the first position to the second position when the pallet is moved over the base with the first stage riser and the second stage riser.

9. The automated loading and unloading system of claim 8, wherein the second stage riser moves up from the second position to the third position when the textile is loaded onto the pallet above the second stage riser.

10. The automated loading and unloading system of claim 9, wherein the second stage riser automatically returns down from the third position back to the second position after the label area of the textile is loaded onto the label printing portion of the pallet.

11. The automated loading and unloading system of claim 10, wherein the first stage riser automatically returns down from the second position to the first position after the label area of the textile is loaded onto the label printing portion of the pallet.

12. The automated loading and unloading system of claim 1, further comprising:

a finger assembly rotatably mounted to the second stage riser, the finger assembly rotating between a forward position and a rearward position.

13. The automated loading and unloading system of claim 1, wherein the finger assembly rotates from the rearward position to the forward position to load a label area of the textile onto the label printing portion of the pallet in advance of the printing operation in the label area of the textile.

14. The automated loading and unloading system of claim 1, wherein the finger assembly rotates from the forward position to the rearward position to unload a label area of the textile from the label printing portion of the pallet after a printing operation in the label area of the textile.

15. An automated loading and unloading system for textile printing, comprising:

a pallet configured with a label printing portion outside of a frame on an image screen when loaded onto the printing machine;

a loading device configured for a first stage of a two stage operation to automatically lift a label area of a textile into position on the label printing portion of the pallet in preparation for a printing operation on the textile;

an unloader device configured for a second stage of the two stage operation to automatically remove the label area of the textile from the label printing portion of the pallet following the printing operation on the textile.

16. The automated loading and unloading system of claim 15, wherein the loading device and the unloader device are operating portions of the same device.

17. The automated loading and unloading system of claim 15, further comprising:

a finger assembly rotatably mounted to the second stage riser, the finger assembly rotating between a forward position and a rearward position;

wherein the finger assembly rotates from the rearward position to the forward position to load a label area of the textile onto the label printing portion of the pallet in advance of the printing operation in the label area of the textile; and wherein the finger assembly rotates from the forward position to the rearward position to unload a label area of the textile from the label printing portion of the pallet after a printing operation in the label area of the textile.

18. The automated loading and unloading system for textile printing of claim 15, wherein during a loading operation the loading device lifts an upper back portion of a shirt through a slot formed in a label printing area of the pallet so that a neck of the shirt catches and remains on the label printing portion of the pallet for the printing operation.

19. The automated loading and unloading system for textile printing of claim 15, wherein the unloader device is configured to drop clear of shirts hanging down from the pallet during rotation of the pallet on the printing machine.

20. The automated loading and unloading system of claim 15, further comprising a printhead adapter configured to reach the label printing portion of the pallet for printing on the label area of the textile.

* * * * *